United States Patent
Reilly et al.

(10) Patent No.: US 10,375,807 B1
(45) Date of Patent: Aug. 6, 2019

(54) CONTROLLER WITH PERIPHERAL VISUAL FEEDBACK

(71) Applicant: ABL IP HOLDING LLC, Conyers, GA (US)

(72) Inventors: John M. Reilly, Leesburg, VA (US); Sean P. White, Reston, VA (US); Jenish S. Kastee, South Riding, VA (US); James Michael Phipps, Fairfax, VA (US); Alexander Daniel Manasseh, Cockeysville, MD (US); Steve Lyons, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/933,752

(22) Filed: Mar. 23, 2018

(51) Int. Cl.
| | |
|---|---|
| *H05B 33/08* | (2006.01) |
| *H05B 39/08* | (2006.01) |
| *H05B 37/02* | (2006.01) |

(52) U.S. Cl.
CPC ....... *H05B 39/085* (2013.01); *H05B 33/0845* (2013.01); *H05B 33/0863* (2013.01); *H05B 37/0218* (2013.01); *H05B 37/0227* (2013.01)

(58) Field of Classification Search
CPC .......................... H05B 39/083; H05B 39/085; H05B 33/0845; H05B 33/0863; H05B 37/02; H05B 37/0209; H05B 37/0245; H05B 37/0218; H05B 37/0227; H05B 37/0272; G06F 3/01; G06F 3/017
USPC .............. 362/23.04, 96, 249.05, 249.12, 802
See application file for complete search history.

(56) References Cited

U.S. PATENT DOCUMENTS

| | | | | |
|---|---|---|---|---|
| 5,833,350 | A * | 11/1998 | Moreland | ................ H01H 9/18 362/95 |
| 6,350,039 | B1 * | 2/2002 | Lee | ........................ H01H 9/181 200/310 |
| 6,388,399 | B1 * | 5/2002 | Eckel | ..................... G01K 1/024 315/158 |
| 7,115,856 | B2 | 10/2006 | Peng et al. | |

(Continued)

OTHER PUBLICATIONS www.microchip.com/downloads/en/DeviceDoc/00001571B.pdf, Microchip, CAP1298, "8-Channel Capacitive Touch Sensor Controller with Proximity Detection & Signal Guard," Microchip Technology Inc., DS00001571B, pp. 1-68 (2013-2015).

(Continued)

*Primary Examiner* — Jason Crawford
(74) *Attorney, Agent, or Firm* — RatnerPrestia

(57) ABSTRACT

A control pod includes a controller to control an environmental condition in a space, and a cover plate covering the controller and having a light transmissive area extending along a substantial section of an outer perimeter of the cover plate. Programming configures a processor to detect user inputs of a control command based on a user action detected via user input response sensors, and based on the detected control command, send a control signal to a device to implement a function corresponding to the detected control command. The processor also controls a light source to selectively provide a light output through the light transmissive area of the cover plate for a period of time following the control command detection, as visible feedback corresponding to the detected control command, for observation by the user, along at least a portion of the section of the light transmissive area of the cover plate.

27 Claims, 19 Drawing Sheets

(56) References Cited

U.S. PATENT DOCUMENTS

| | | | | |
|---|---|---|---|---|
| 8,003,886 B1* | 8/2011 | Rintz | ............... | H01H 9/0235 |
| | | | | 174/66 |
| 8,393,747 B2* | 3/2013 | Kevelos | ............... | H01H 13/83 |
| | | | | 362/551 |
| 9,119,239 B2 | 8/2015 | Engel-Hall et al. | | |
| 9,389,769 B1* | 7/2016 | O'Keeffe | ............... | G06F 1/3262 |
| 9,462,664 B2 | 10/2016 | Engel-Hall et al. | | |
| 9,464,795 B2* | 10/2016 | Ebeling | ............... | H01R 13/5213 |
| 9,575,587 B2* | 2/2017 | O'Keeffe | ............... | G06F 1/3262 |
| 2009/0046071 A1* | 2/2009 | Griffin | ............... | G06F 1/1626 |
| | | | | 345/173 |
| 2010/0013649 A1* | 1/2010 | Spira | ............... | G06F 3/041 |
| | | | | 340/664 |
| 2011/0036694 A1* | 2/2011 | Daffin, III | ............... | H05B 37/0227 |
| | | | | 200/33 R |
| 2011/0178650 A1* | 7/2011 | Picco | ............... | H05B 37/0254 |
| | | | | 700/295 |
| 2012/0026726 A1* | 2/2012 | Recker | ............... | F21S 9/037 |
| | | | | 362/157 |
| 2012/0242248 A1* | 9/2012 | Drummond | ............... | H05B 33/0851 |
| | | | | 315/297 |
| 2013/0148323 A1* | 6/2013 | Yang | ............... | H01H 9/161 |
| | | | | 361/807 |
| 2015/0145420 A1* | 5/2015 | Simonian | ............... | G06F 3/017 |
| | | | | 315/154 |
| 2017/0117891 A1* | 4/2017 | Lohbihler | ............... | G08C 17/02 |
| 2017/0329407 A1* | 11/2017 | Van Laack | ............... | G06F 3/016 |
| 2019/0042000 A1* | 2/2019 | Kasmieh | ............... | G06F 3/038 |

OTHER PUBLICATIONS https://www.microchip.com/wwwproducts/MGC3030, "MGC3030/3130 3D Tracking and Gesture Controller Data Sheet," MGC3030/3130, Microchip Technology Inc., DS40001667E, pp. 1-50 (2012-2017).

http://www.microchip.com/design-centers/capacitive-touch-sensing/gestic-technology/over . . . , Microchip; GestIC Technology, "Microchip's Advanced Multi-Touch Controller", printed Feb. 15, 2018 (3 pages).

http://www.microchip.com/design-centers/capacitive-touch-sensing/gestic-technology/over . . . , Microchip; GestIC Technology, "Gesture Control: Simplicity", printed Feb. 15, 2018 (3 pages).

* cited by examiner

CONTROLLER WITH PERIPHERAL VISUAL FEEDBACK

TECHNICAL FIELD

The present subject matter relates to techniques and equipment to provide peripheral visual feedback for controllers with various types of user interfaces.

BACKGROUND

Electrical powered artificial lighting has become ubiquitous in modern society. Common uses for electrical lighting devices include, for example, in homes, hospitals, buildings of commercial and other enterprise establishments, as well as in various outdoor settings. Traditional light fixtures or luminaires have tended to be relatively dumb, in that the light fixtures or luminaires power ON/OFF, and in some cases dim, usually in response to user activation of a relatively simple input device.

Since the advent of electronic light emitters, such as light emitting diodes (LEDs), for general lighting type illumination application, lighting equipment has become increasingly intelligent with incorporation of sensors, programmed controllers and network communication capabilities. Automated control, particularly for enterprise installation, such as for retail or office space or hospitals, etc, may respond to a variety of sensed conditions, such as daylight or ambient light level and occupancy as well as to various types of user inputs. Similar types of controllers may be used to operate or control other types of equipment on the premises, such as heating, ventilation and air conditioning (HVAC), other building management systems (BMS) services such as access and/or surveillance, or various appliances.

The controllers for existing systems have fixed interfaces to receive user input for lighting or other on-premises functions. There have been proposals and some products that offer touch or gesture inputs. The surfaces of the interfaces for controllers sense the user inputs; however, problems arise with erroneous sensed input at the controller when the user is unclear of a status or function of an input, or a mode of the system, especially in a control system with multiple zones, or when the user must rely upon tactile feedback of a mechanical switch or panel.

SUMMARY

Hence a need exists for providing an improved interface module for system controllers and user interfaces having peripheral visual feedback.

The concepts disclosed herein alleviate one or more of the above noted problems with and/or improve over prior controller technology, for example, by providing peripheral visual feedback for system controls and user interfaces.

In an example, a control pod includes a controller, and a cover plate configured to cover the controller when the control pod is mounted on or recessed into an architectural structural in a space. The cover plate includes a surface configured to be exposed to a user within the space, and a light transmissive area extending along a substantial section of an outer perimeter of the cover plate. The controller includes a user input responsive sensor; a selectively controllable light source coupled to the light transmissive area substantially along the outer perimeter of the cover plate; and a driver circuit coupled to drive the light source to selectively emit light through points of the light transmissive area around the outer perimeter of the cover plate. The controller further includes a transmitter circuit, configured to transmit control signals to operate a device configured to control an environmental condition in the space; and a processor coupled to respond to data corresponding to user inputs sensed by the use input responsive sensor, coupled to control the light source via the driver circuit, and coupled to the transmitter circuit. The processor is configured to detect the user input of a control command based on a user action detected via the user input response sensor, and based on the detected control command: cause the transmitter circuit to send a control signal to the device to implement a function corresponding to the detected control command; and control the light source via the driver circuit to selectively provide a light output through the light transmissive area of the cover plate for a period of time following control command detection, as visible feedback corresponding to the detected control command, for observation by the user, along at least a portion of the section of the light transmissive area of the cover plate.

In another example, a control pod includes a controller and a cover plate configured to cover the controller when the control pod is mounted on or recessed into an architectural structure in a space. The cover plate includes: a surface configured to be exposed to a user within the space; and a light transmissive area extending along a substantial section of an outer perimeter of the cover plate. The controller includes: a user input responsive sensor; a selectively controllable light source coupled to the light transmissive area along the outer perimeter of the cover plate; a processor coupled to respond to user inputs sensed by the sensor and coupled to control the light source. The processor is configured to detect user input of an environmental control command based on a user action detected via the user input responsive sensor, and based on the detected control command, control the light source to selectively provide visible feedback in the form of a selective light output through the section of the light transmissive area along a portion of the outer perimeter of the cover plate, where the selective light output corresponds to the detected control command.

In another example, a control pod includes a controller, and a cover plate configured to cover the controller when the control pod is mounted on or recessed into an architectural structural in a space. The cover plate includes a surface configured to be exposed to a user within the space, a shoulder along a portion of an outer perimeter of the cover plate and extending from a plane of the surface; and a light transmissive area extending along a substantial section of the outer perimeter of the cover plate. The controller includes a user input responsive sensor; a selectively controllable light source coupled to the light transmissive area along the outer perimeter of the cover plate; and a driver circuit coupled to drive the light source to selectively emit light in a lateral direction from the shoulder of the cover plate and through points of the light transmissive area around the perimeter of the cover plate. The controller further includes a transmitter circuit, configured to transmit control signals to operate a device configured to control an environmental condition in the space; and a processor coupled to respond to data corresponding to user inputs sensed by the use input responsive sensor, coupled to control the light source via the driver circuit, and coupled to the transmitter circuit. The processor is configured to detect the user input of a control command based on a user action detected via the user input response sensor, and based on the detected control command: cause the transmitter circuit to send a control signal to the device to implement a function corresponding to the detected control command; and control the light source via the driver circuit to selectively provide a light output through the light transmissive area of the cover plate for a period of time following control command detection, as visible feedback corresponding to the detected control command, for observation by the user, along at least the section of the transmissive area of the cover plate.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1:
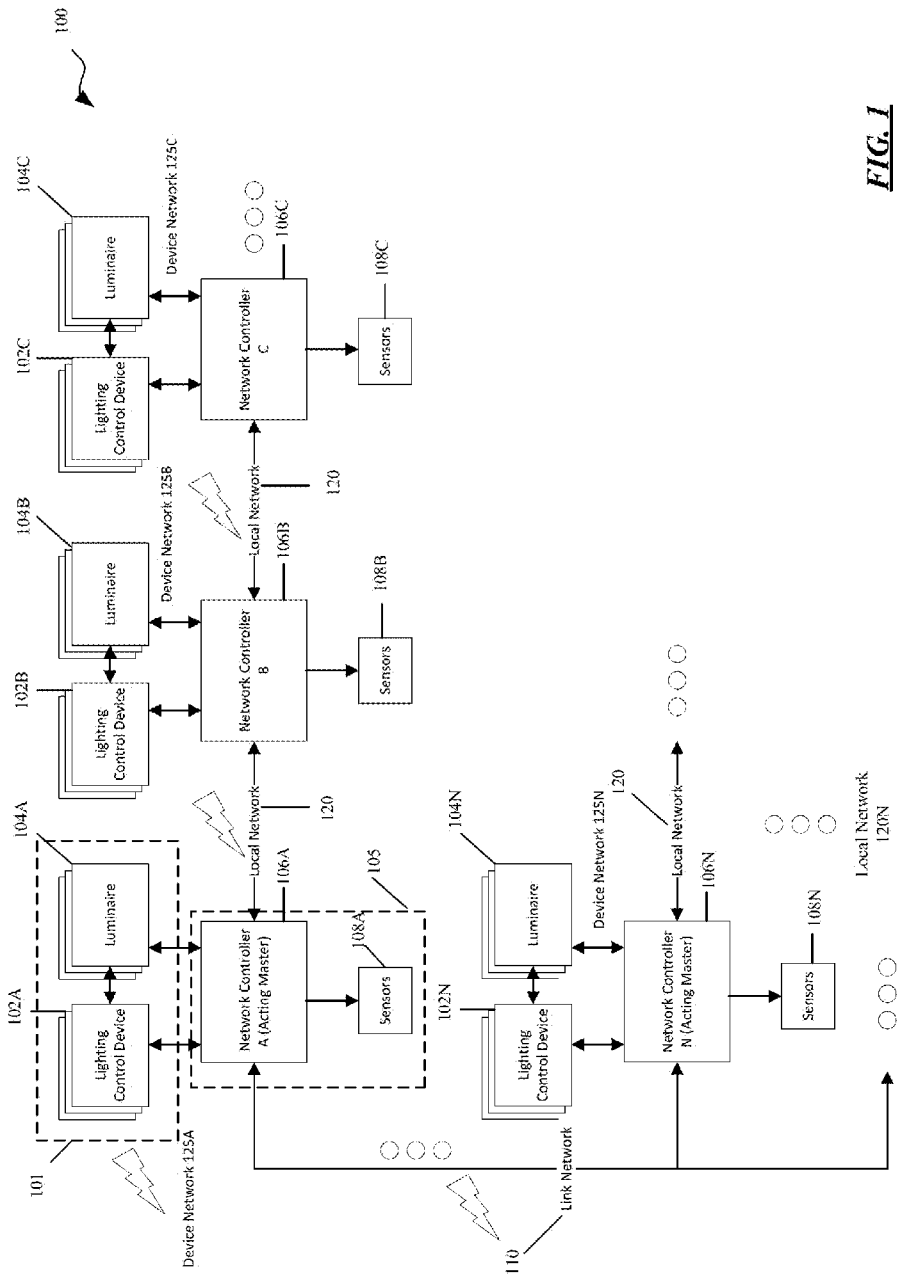
FIG. 1 is a high-level functional block diagram of an example including a control pod for a lighting control system of networks and devices designed to provide peripheral visual feedback of user inputs, operation status and modes of the system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The term "wall controller," as used herein, is intended to encompass any type of device, component, or combination thereof that communicates with any combination of components of a system, for example and not limited to, a lighting system to control operations of luminaires, for example, turning the luminaires on/off, adjusting a dimming level, or any other preset function that may be based on executable software or hardware programming code. The wall controller is typically located or configured within a zone or area of the devices being controlled. The wall controller is not limited to wall mounting and may be arranged on any surface or as a mobile device, such as a laptop computer, tablet or smartphone, which allow local and/or remote communication with the luminaires of the lighting system.

The term "control pod," as used herein, is intended to encompass a control console to contain any type of device, component, or combination thereof that communicates with and/or control operations of, for example, lighting, thermostats for HVAC, or other building management systems (BMS). The control pod is not limited to wall mounting and may be arranged on any surface or as a mobile device, such as a laptop computer, tablet or smartphone, which allow local and/or remote communication with devices such as luminaires, thermostats or other appliance of the BMS system such as and no limited to humidifiers, microwave ovens, power monitors fans, water flow/monitoring devices, emergency shut off/on controls, or audio systems.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application. Suitable light generation sources include various conventional lamps, such as incandescent, fluorescent or halide lamps; one or more light emitting diodes (LEDs) of various types, such as planar LEDs, micro LEDs, micro organic LEDs, LED on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent diodes (SLD) and micro laser diodes. Of course these light generation technologies are given by way of non-limiting examples, and other light generation technologies may be used.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The term "gesture" as used herein refers to movement of a part or appendage of a user's body, such as a hand or one or more fingers, etc., according to one or more designated movements to express an intended action.

Light output from the luminaire may carry information, such as a code (e.g. to identify the luminaire or its location) or downstream transmission of communication signaling and/or user data. The light-based data transmission may involve modulation or otherwise adjusting parameters (e.g. intensity, color characteristic or distribution) of the illumination light output from the device.

Detailed references to examples illustrated in the accompanying drawings and discussed below are provided. Although specific examples are provided for lighting, the control pod and disclosed features are not limited to lighting systems and may be adapted to provide visual feedback for user inputs and control of other building management systems (BMS) such as thermostat control in heating, ventilation and air conditioning (HVAC) systems, humidifiers, water flow/control, audio systems, cooking appliances, building access and security systems, or any combination of connected Internet of Things (IoT) devices or home appliances.

Reference now is made in detail to the examples illustrated in the accompanying drawings and discussed below. FIG. 1 illustrates a high-level functional block diagram of a non-limiting example including a control pod for a lighting control system of networks and devices designed to provide peripheral visual feedback of a control command based on a user action detected by a user input responsive sensor, operation status and mode of the system, as well as implement a device function corresponding to the detected control command.

A lighting control system 100 of FIG. 1, uses, for example, a local data network 120 and link network 110, and devices that provide a variety of lighting capabilities, including communication in support of lighting functions such as turning lights on/off, dimming, or other system control functions utilizing a lighting control device 102A-N with touch and touchless sensing capabilities, for example, to control an output of a luminaire 104A-N or other building management systems (BMS) functions. As shown, luminaires 104A-N, sensors 108A-N, and lighting control devices 102A-N are connected to respective network controllers 106A-N via a local network 120 although the connection passes through a respective device network 125A-N. The devices that provide the variety of lighting capabilities are illustrated, for example, as lighting control devices 102A-N that can be, an alternative to the network controller 106 of this example, a wall switch or controller, or a user interface. The lighting control devices 102A-N and luminaire 104A-N (grouped together as element 101 in FIG. 1) in the lighting control system 100 may be for example, an Acuity Brands Lighting nLight® enabled device, meaning the devices are networked together and have the ability to communicate over an nLight® network using a software application such as SensorView. Alternatively, the devices of the lighting control system 100 are not limited by the nLight® network, and may be configured to communicate using another network architecture and protocol known in the art, for example, 0-10 v, digital addressable lighting (DALI), BACnet, digital multiplex (DMX), RDX, phase-cut, etc. Communications may use any suitable wired or wireless media.

More specifically, the network topology of lighting control system 100 includes a collection of system components comprised of network controllers 106A-N, luminaires 104A-N (e.g., light fixtures, table lamps, floor lamps, or night lights), sensors 108A-N, and lighting control devices 102A-N. The light fixture may be, for example, a recessed cove fixture, under-cabinet lighting, direct/indirect pendant lighting, a recessed can, wall wash lighting, a wall sconce, task lighting, a recessed fluorescent light, a chandelier, a ceiling fan light, an outdoor yard light, etc. The system components are connected by a specific combination of hierarchal wired, wireless, and virtual connections. The illustrated networks 110, 120 A-N, and 125A-N can be via nLight® (commercially available from Acuity Brands Lighting), digital multiplex (DMX) control, RS-485, CAN, Ethernet, a local area network, (LAN, e.g., Intranet), a wide area network (WAN, e.g., Internet), wireless mesh network (e.g., Zigbee), and a personal area network (e.g., Bluetooth or Z-Wave). DMX control, nLight®, and Z-Wave are lighting-centric networks that control a variety of luminaires, and therefore are utilized for local networks 120A-N and device networks 125A-N, in the example. The link network 110 may be a LAN, such as Intranet, or Internet, in the example. Accordingly, link network 110, local networks 120A-N, and device networks 125A-N may utilize different communication protocols, for example, the lighting control system 100 is a hierarchical network. The link network 110, local network 120A-N, and device network 125A-N may be a different part of the same network tree or star network, and therefore are not separate networks and can utilize the same network communication protocols.

The luminaires 104A-N, sensors 108A-N, and lighting control devices 102A-N do not have to be directly connected to a respective network controller 106A-N (which in this example serves as the control panel). For example, because luminaires 104A-N are controlled by respective lighting control device 102A-N, some or all communication destined to or from respective network controllers 106A-N via device network 125A-N related to lighting control events is via respective lighting control devices 102A-N. Hence, luminaires 103A-N and sensors 108A-N can be indirectly connected to respective device networks 125A-N through respective lighting control devices 102A-N, for example, in order to receive lighting-based controls. In other words, luminaires 104A-N and sensors 108A-N can be driven or controlled by lighting control devices 102A-N via device networks 125A-N. Of note, several network controllers 106A-N or lighting control devices 102A-N can control a single luminaire 104A-N. Moreover, luminaires 104A-N and sensors 108A-N may be in direct communication with each other via devices networks 125A-N.

Lighting control devices 102A-N, when used as a wall switch or control panel, can include one or more user interface elements, such as an indicator light (e.g., a plurality of light sources), display screen, etc. For example, the indicator light may include a plurality of controllable light sources arranged along an entire perimeter of a cover plate of the control pod 105 including the lighting control device 102A-N and network controller 106A-N. The controllable light sources are configured to provide visual feedback along substantially the entire perimeter of the cover plate to correspond to a control command of a user of the lighting control system 100. The plurality of light sources can be of a single or multiple variable light intensities and/or colors. Also, the plurality of light sources can be a light emitting diode (LED), organic light emitting diode (OLED), electroluminescent, or other appropriate light source. Sensors 108A-N can be ambient light sensors, daylight sensors, motion sensors, proximity sensors, occupancy and vacancy sensors, audio, temperature, infrared sensors, ultrasonic sensors, or other environmental sensors and the like.

The lighting control system 100 is a non-limiting example to provide multiple dimensions of information to the user to improve the user's ability to use BMS such as lighting control system 100 effectively and guide user behavior. For example, using one of a plurality of touch or gesture movements, or voice commands, the result(s) of a user's input control commands may be visually displayed as a pattern of illuminated/non-illuminated LEDs located on an outer perimeter of the control pod to provide feedback information to the user regarding a function of the lighting system such as turning lights on/off, dimming/brightening, zone or mode status, or other environmental building management service (BMS) status information such as HVAC operation, temperature control, humidity control, emergency shut on/off, water flow/control, audio system controls, or security and building access.

Network controllers 106A-N are nodes that act in response to detected user input control commands, detections from the sensors 108A-N, or other unspecified events, and control end devices within the lighting control system 100. For example, the detections from the sensors 108A-N may include a user approaching a device which make uses of a proximity sensor, or the ambient light level changes due to a light fixture output adjustment, or a change is detected in the light level through a photocell, or any number of other sensory devices used within the lighting control system 100. The detections by the sensors 108A-N may be processed to initialize the lighting system 100 and enter a sleep or wake idle mode until a user input or environmental input control command is detected.

Figure 2A:
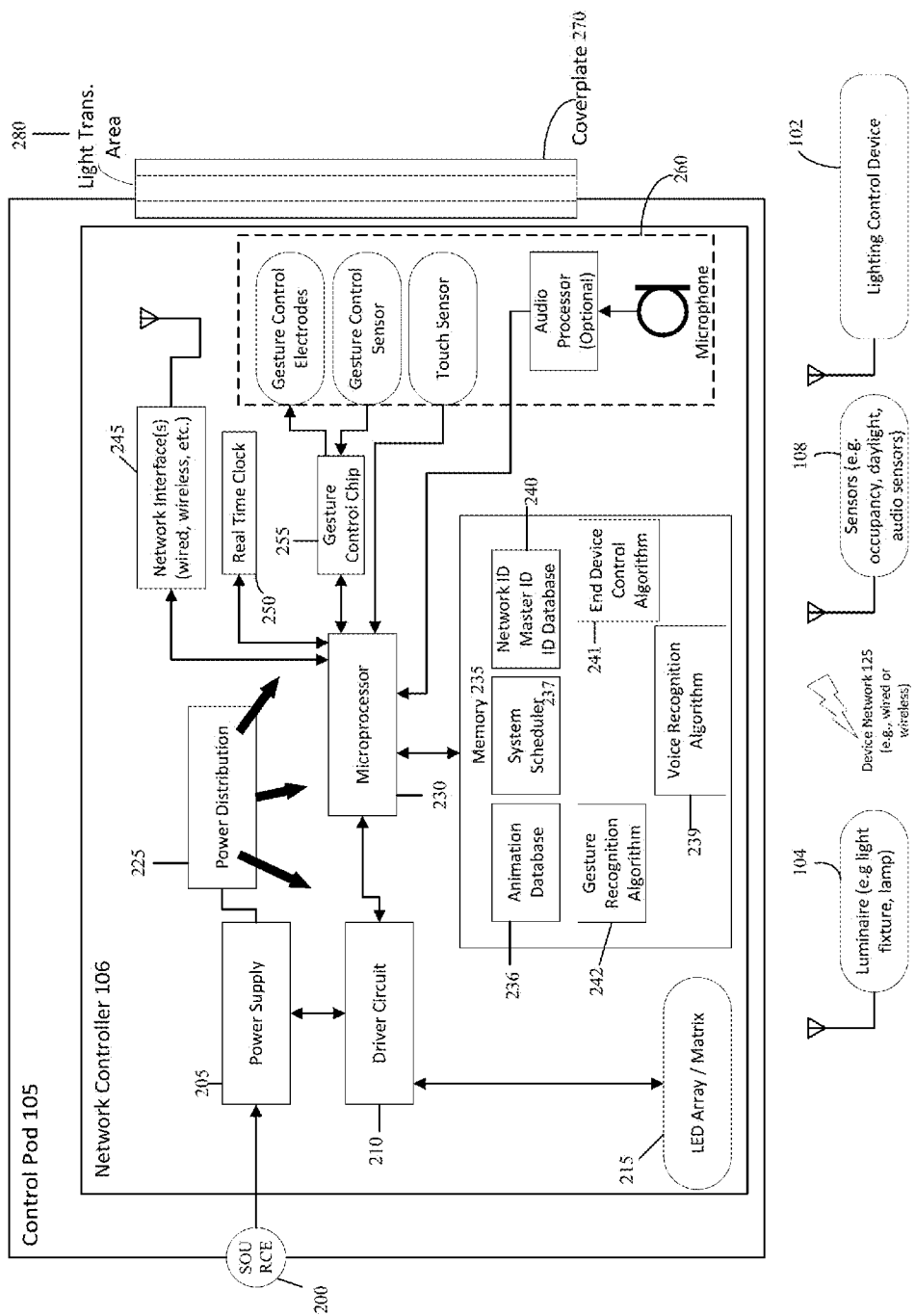
FIG. 2A is a block diagram of an example control pod that communicates via the lighting control system of FIG. 1.

FIG. 2A is a block diagram of an example control pod that communicates via the lighting control system of FIG. 1. The control pod 105 includes a network controller 106, and a cover plate 270. The control pod 105 is mounted on or recessed into an architectural structure within a space. The network controller 106 is in communication with a luminaire 104 (e.g., a light fixture or lamp), a sensor 108 (e.g., occupancy, daylight, or audio sensors), and lighting control device 102. In the network controller 106 of FIG. 2A, power supply 205 receives power from power source 200, such as an AC mains, battery, solar panel, or any other AC or DC source. Power supply 205 may include a magnetic transformer, electronic transformer, switching converter, rectifier, or any other similar type of circuit to convert an input power signal into a power signal suitable for controllable light sources, for example, LED Array/Matrix 215. LED array/matrix 215 can include, for example, light emitting diodes (LEDs) or other light sources, for example, an organic light emitting diode (OLED), electroluminescent, or other appropriate light source that emit varied colors such as red, green, and blue (RGB) light or tunable white light. The light sources of the LED array/matrix 215 may have varied intensity or brightness levels.

Network controller 106 further includes, a driver circuit 210, for example, an intelligent LED driver circuit. Driver circuit 210 is coupled to LED array/matrix 215 and drives the LED array/matrix 215 by regulating the power to the LED array/matrix 215 to provide a constant quantity or power to the LED array/matrix 215 as its electrical properties change with temperature, for example. Driver circuit 210 may be a constant-voltage driver, constant-current driver, or AC LED driver type circuit that provides dimming through a pulse width modulation circuit and may have many channels for separate control of different LEDs or LED arrays that comprise LED array/matrix 215. An example of a commercially available intelligent LED driver circuit 210 is manufactured by EldoLED.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the LED array/matrix 215 that may include a DC offset, such that its average value is nonzero, and/or an AC voltage.

Network controller 106 includes power distribution circuitry 225, a microprocessor 230, a memory 230, and a real time clock 250. As shown, microprocessor 230 is coupled to driver circuit 210, for example, a matrix type driver, and the microprocessor 230 includes a central processing unit (CPU) that controls the light source operation of the LED array/matrix 215. Memory 235 can include volatile and non-volatile storage. The real time clock 250 in conjunction with a real time operating system (RTOS) programming stored in the memory 235 (not shown) support multiple concurrent processing threads for different simultaneous control or intelligent communication operations of the network controller 106.

The power distribution circuitry 225 distributes power and ground voltages to the microprocessor 230, memory 235, network interface(s) 245 (e.g., wireless transceivers), real time clock 250, gesture control chip 255, and user input responsive sensors 260.

Network interface(s) 245 allows for data communication (e.g., wired or wireless) over all three types of networks 110, 120A-N, and 125A-N. For example, network controller 106 may include a tri-band wireless radio communication interface system configured for wireless communication via separate radios that operate at three different frequencies, such as sub-GHz (e.g., 900 MHz), BLE (2.4 GHz), and 5 GHz, for example. A first transceiver of such a network communication interface system is for communication, over a lighting device network, with a sensor, a lighting control device, and a luminaire (e.g., a dimmable light fixture) to adjust lighting intensity of the luminaire based on any local lighting event messages and any global event messages.

Microprocessor 230 serves to perform various operations, for example, in accordance with instructions or programming executable by the microprocessor 230. For example, such operations may include operations related to communications with luminaire 104 or other connected end device, sensor 108, and other network controllers during the process of providing a visible feedback light output through the light transmissive area 280 of the cover plate 270 for a period of time, for example, about 1-5 seconds, following a control command detection by at least one of the user input responsive sensors 260. The duration for the period of time of the visible feedback is tunable and variable for a long enough time provide sufficient time for the user to see and understand the visible feedback provided from the pattern of lights. The visible feedback emitted through the light transmissive area 280 corresponds to the detected control commands input by a user of the lighting control system 100. Although a processor may be configured by use of hardwired logic, typical processors are general processing circuits configured by execution of programming. Microprocessor 230 includes elements structured and arranged to perform one or more processing functions, typically various data processing functions. Although discrete logic components could be used, the examples utilize components forming a programmable CPU. A microprocessor 230 for example includes one or more integrated circuits (IC) chips incorporating the electronic elements to perform the functions of the CPU. The microprocessor 230, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in network controller 106, luminaires 104A-N, sensors 108A-N, lighting control devices 102A-N, or other network elements, etc.

Memory or storage system 235 is for storing data and programming. In the example, the memory system 235 may include a flash memory (non-volatile or persistent storage) and a random access memory (RAM)(volatile memory). The RAM serves as short term storage for instructions and data being handled by the microprocessor 230, e.g., as a working data processing memory. The flash memory typically provides longer term storage.

Other storage devices or configuration may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications during the processing of the input control commands and visible feedback based upon the control commands by the network controller 106. Program aspects of the technology may be thought of as "products" or "articles of manufacture" typically in the form of executable code or process instructions and/or associated data that is stored on or embodies in a type of machine or processor readable medium (e.g., transitory or non-transitory), such as memory 235, or a memory of a computer used to download or otherwise install such programming into the network controller 106, or a transportable storage device or a communications medium for carrying program for installation in the network controller 106.

As illustrated, the network controller 106 includes programming in the memory 235 which configures the microprocessor 230 to control operations of the LED array/matrix 215, including the communications over the network interface(s) 245 via the tri-band wireless radio communication interface system. The programming in the memory 235 includes, for example, an animation database 236, which includes a plurality of animated patterns such as single or symmetrical comets or orbits that may be used for the light output patterns to provide peripheral visual feedback, a gesture recognition algorithm 242, a system scheduler 237, a voice recognition algorithm, 239, and an end device control algorithm 241. The memory also stores an identifier database 240 that includes a network controller identifier, local network identifier, and schedule master identifier. Network controller identifier is a unique numeric (or alphanumeric) identifier of the network controller 106 and, in some cases, signifies the priority of one network controller over another regarding how messages are handled (e.g., designation of which is the acting master controller). The network controller identifier is unique per local network and the network identifier represents the overall uniqueness of the network controller 106. The network identifier may also represent a logical collection of network controllers 106 on different and separate local networks, for example, network identifier can be a zone identifier. The various stored identifiers in the identifier database 240 are used during the transmission of messages over networks 110, 120A-N, and 125A-N to identify users and input control commands to applying lighting controls and providing visual feedback to the users along the light transmission area 280 of the cover plate 270. The animation database 236 consists of a list of gesture patterns recognized by the controller to perform a function of the system. The list of gesture patterns includes frame-by-frame definitions of various LED animations where the brightness of each LED is controlled over time to convey motion; tables that map the light sources to control input/outputs of the microprocessor for each gesture response; and program instructions or firmware to indicate the pattern of illuminated lights along the periphery of the control pod that correspond to the input command. The gesture recognition algorithm 242 is firmware including any mathematical formulae, a set of rules, equations, and configurations used to interpret time varying positional data of an input at or near a surface of the cover plate 270 of the control pod 105, for example, a user's hand or a conductive object in front of the control pod. The voice recognition algorithm 239 consists of signal processing code and instructions/firmware used to interpret and convert input sound data to clear text, and then analyze the clear text to derive a control command for controller function of the system. The system scheduler 237 is an embedded computer algorithm to determine the order, priority, and CPU resource allocation for the microprocessor's 230 various tasks. The end device control algorithm 241 includes a set of rules and formulae to control a networked device, for example, a light fixture in the example of FIG. 1, integrated with the controller 106 of the control pod of the lighting control system 100. The end device control algorithm 241 uses data or information from the other algorithms of the memory 230 to control or perform, for example, a dimming function for the connected end device.

The network controller 106A-N further includes user input responsive sensors 260 arranged to detect user input of an environmental control command to control functions such as lighting control, heating, ventilation and air condition (HVAC) control, building management systems (BMS) such as thermostat or humidity control, water flow, audio systems, emergency shut on/off, or home appliance control such as microwave ovens. The user input responsive sensors may include, an arrangement of gesture control electrodes and sensors that use, for example, electric field (E-field) sensing to detect near field gestures from conductive objects such as the human body. The gesture control electrodes and sensors may be arranged on a printed circuit board within the control pod 105 and connected to communicate with the microprocessor 230 of the network controller 106A-N. The gesture control electrodes and sensor may also be arranged in a single chip structure such as in a gesture control chip 255, for example, a MGC3030/3130 Microchip. The user input responsive sensors 260 may also include touch sensors of any self-capacitance configuration type known in the art to provide a variety of button and proximity functionality, for example, a CAP 1298 Microchip capacitive touch sensor. The user input responsive sensors 260 may further include a microphone arranged to detect audio and voice input and activity. In conjunction with the microphone, further included in the control pod 105 is an audio converter such as an audio to digital (AD converter) or audio coder/decoder (CODEC) to convert analog audio signals from the microphone to digital signals. In particular, the detected audio or voice input from the microphone is converted from an analog signal to a digital format via the audio processor. A digital signal processor is coupled to the converter to parse the digital signals. The digitized audio signal are supplied to the microprocessor 230 as digital repetitions of speech inputs for processing to determine whether the signal contains an environmental control command to implement a function of the lighting control system 100. The environmental control commands may include any one or combination of hand or gesture motions, touch inputs, or specific speech input that are detected at or near the surface of the cover plate 270 of the control pod 105 by the user input responsive sensors 260 of the controller 106.

The cover plate 270 is configured to cover the control pod 105 when the control pode 105 is mounted on or recessed into an architectural structure in a space of the lighting control system 100. The cover plate 270 includes a continuous surface that is exposed to a user within the space, and a shoulder portion, that is contiguous to and extends away from a plane of the surface of the cover plate 270, and is arranged along, for example, the entire perimeter of the cover plate and the surface of the cover plate 270. A light transmissive area 280 is formed through the shoulder around the perimeter of the cover plate such that the light transmissive area 280 is arranged to extend substantially along the outer perimeter of the cover plate 270, where the term substantially is meant to indicate a portion sufficient to convey visible feedback pattern of lights to the user.

Figure 2B:
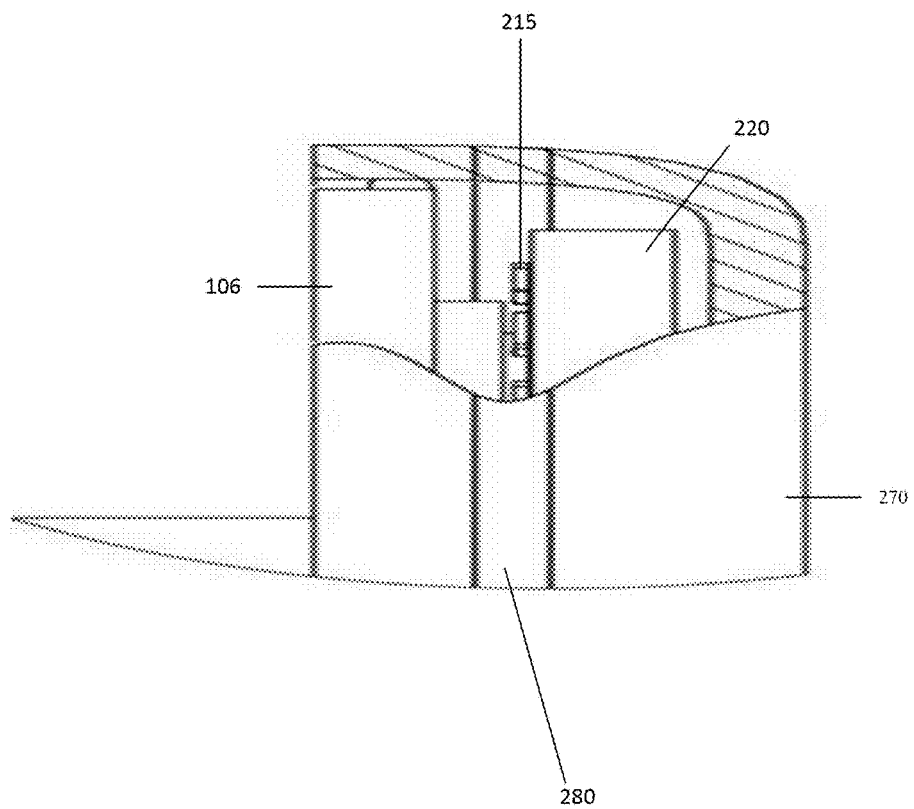
FIG. 2B is a side detail view, partially in cross section, of a portion the cover plate of the network controller in the lighting control system of FIG. 1.

FIG. 2B is a side detail view, partially in cross section, of a portion of the cover plate that covers the control pod of the lighting control system of FIG. 1. The cover plate 270 is a rigid plastic material, for example, a thermoplastic material such as an acrylonitrile butadiene styrene (ABS) plastic, an acrylic, and a polycarbonate. Alternatively, the material for the cover plate 270 may include a metal, glass or ceramic based upon the aesthetic and functionality requirements for the control pod. A surface of the cover plate 270 may be opaque, as well as exposed and accessible to a user within a space of the lighting control system 100 for user input. The shoulder portion of the cover plate 270 may be a translucent plastic or glass material. An array of, for example, configurable LED light sources 215 is arranged on a printed circuit board 220 substantially along, for example, the outer perimeter of the cover plate 270. The light sources 215 are configured to selectively emit light in a lateral direction from the shoulder of the cover plate 270. For example, light may be directly emitted sideways through the light transmissive area 280 through the shoulder of the cover plate 270, and at least partially onto regions of the architectural structure around the cover plate 270 (e.g., walls or a countertop). Alternatively, an additional component such as a reflector, light guide or diffuser may be included in the control pod to redirect light emitted from the light sources such that the output is indirectly emitted laterally or sideways with respect to the light source.

Figure 3:
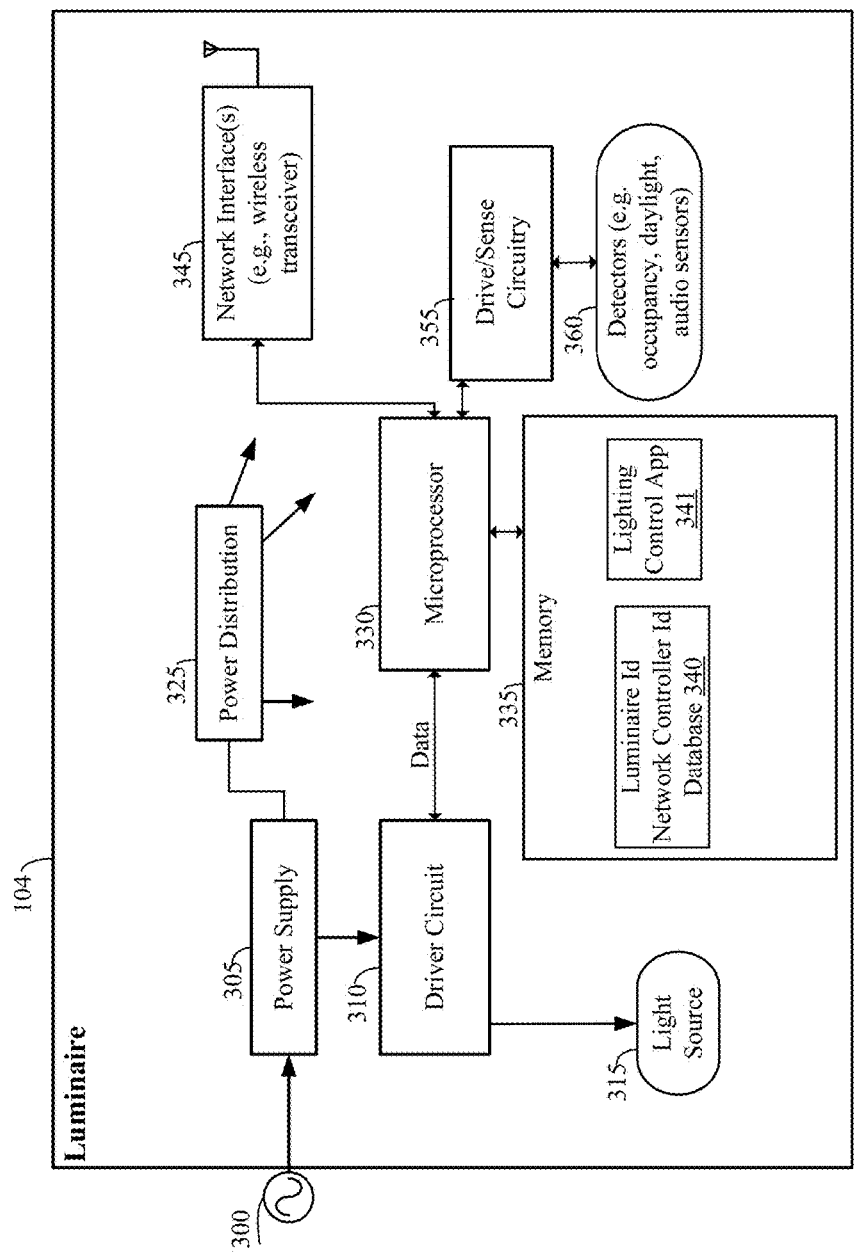
FIG. 3 is a block diagram of a luminaire that communicates via the lighting control system of FIG. 1.

FIG. 3 is a block diagram of a luminaire that communicates via the lighting control system of FIG. 1. The circuitry, hardware, and software of luminaire 104 are similar to the network controller of FIGS. 2A-B and further may further include detectors 360 and drive/sense circuitry 355.

Luminaire 104 may be a singularly addressable device designated by a luminaire identifier and is configured to operate as a member of a respective device network 125 as illustrated in FIG. 1, or a zone. Hence, the network interface(s) 345 of luminaire 104 may comprise, for example, a single radio for communication over device network 125, as opposed to the tri-band network communication interface of network controller 106 for communication over the three different types of networks 110, 120, and 125.

Luminaire 104 is represented by a unique device identifier, such as a serial number, media access control (MAC) address etc. In the example, the identifier database 340 in memory 335 stores a luminaire identifier that can be an alphanumeric identifier to uniquely identify luminaire 104 on a given device network, and a network controller identifier that uniquely identifies the network controller that controls the luminaire, such as by managing a schedule. Upon receipt of a lighting or environmental control command message from the network controller 106 or the lighting control device 102, the luminaire 104 is controlled to provide visible feedback in the form of a selective light output pattern through the light transmissive area 280 extending along a substantial section of an outer perimeter of the cover plate 270 configured over the network controller 106.

Figure 4:
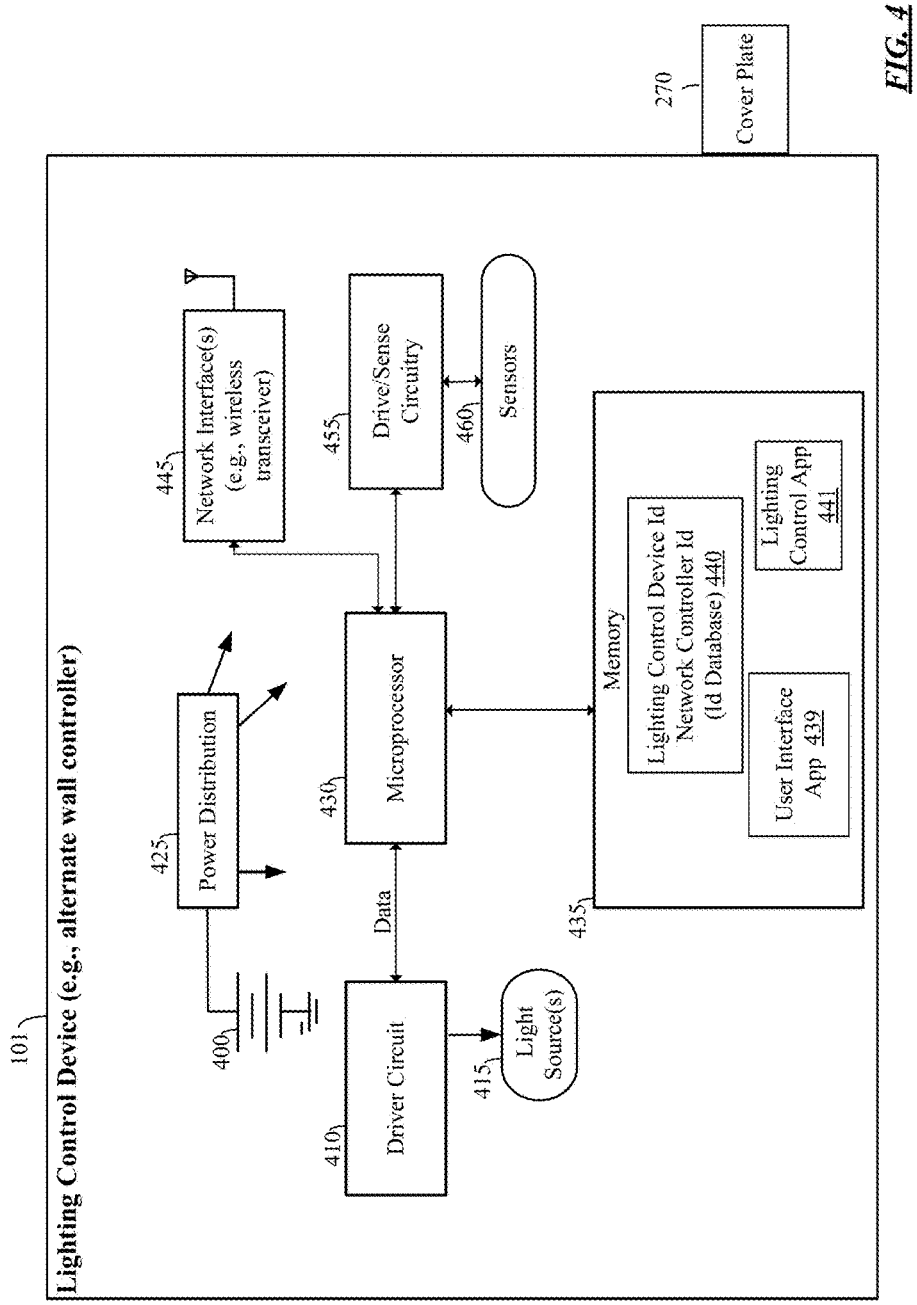
FIG. 4 is a block diagram of a lighting control device that communicates via the lighting control system of FIG. 1.

FIG. 4 is a block diagram of a lighting control device that communicates via the lighting control system of FIG. 1, as an alternate example of the network controller 106 as the user interface or controller/wall switch for the lighting system 100. The circuitry, hardware, and software of lighting control device 102 are similar to those of the network controller 106 of FIG. 2A and luminaire 104 of FIG. 3. Lighting control device 102 is a device that drives outputs of a user interface element, such as light source(s) 415 based on user input lighting or environmental control commands. Lighting control device 102 also processes lighting control inputs in order to control a luminaire 104, but typically does not itself include a light source for purposes of artificial illumination of a space intended for occupancy by a living organism (i.e., space lighting).

The network communication interface 445 of lighting control device 102 may include a first transceiver to communication with a network controller to receive an illumination pattern for a user interface element of a lighting control device configured to control the luminaire. The illumination pattern produces visible output to the user via the user interface element to instruct the user of the selected lighting or environmental entered function, a status of the lighting system, or zone indications. A second transceiver may communication over the lighting device network, with the at least one luminaire to adjust a light intensity of the at least one luminaire 104.

Lighting control device 102 may be a singularly addressable device designated by a lighting control device identifier and is configured to operate as a member of a respective device network 125 as illustrated in FIG. 1, or a zone. Hence, the network interface(s) 445 of lighting control device 102 may comprise a single radio for communication over device network, as opposed to the tri-band network communication interface of network controller 106 used to communication over the three different types of network 110, 120, and 125.

Lighting control device 102 is represented by a unique device identifier and the memory 435 stores an identifier database 440 that has a lighting control device identifier, such as an alphanumeric identifier, that uniquely identifies lighting control device 102 on a given device network. The identifier database 440 in the memory 435 also stores a network controller identifier that uniquely identifies the network controller 106 that manages the lighting control device 102.

In the example of FIG. 4, the lighting control device 102 may be a wall switch where the drive/sense circuitry 455 responds to actuation and/or state of one or more switches 460. The sensors 460 include or are coupled to respond to an action by the user. Sensors 460 can include one or more of an on/off sensor, ambient light sensor or a proximity sensor. The lighting control application 441 generates local lighting control messages based on the lighting control adjustments from the sensors 460.

The programming in the memory 435 include, for example, a user interface application 439, and a lighting control application 441 or other control application for the specific end device. The memory also stores an identifier database 440 that includes a lighting control device identifier and a network controller identifier.

Figure 5:
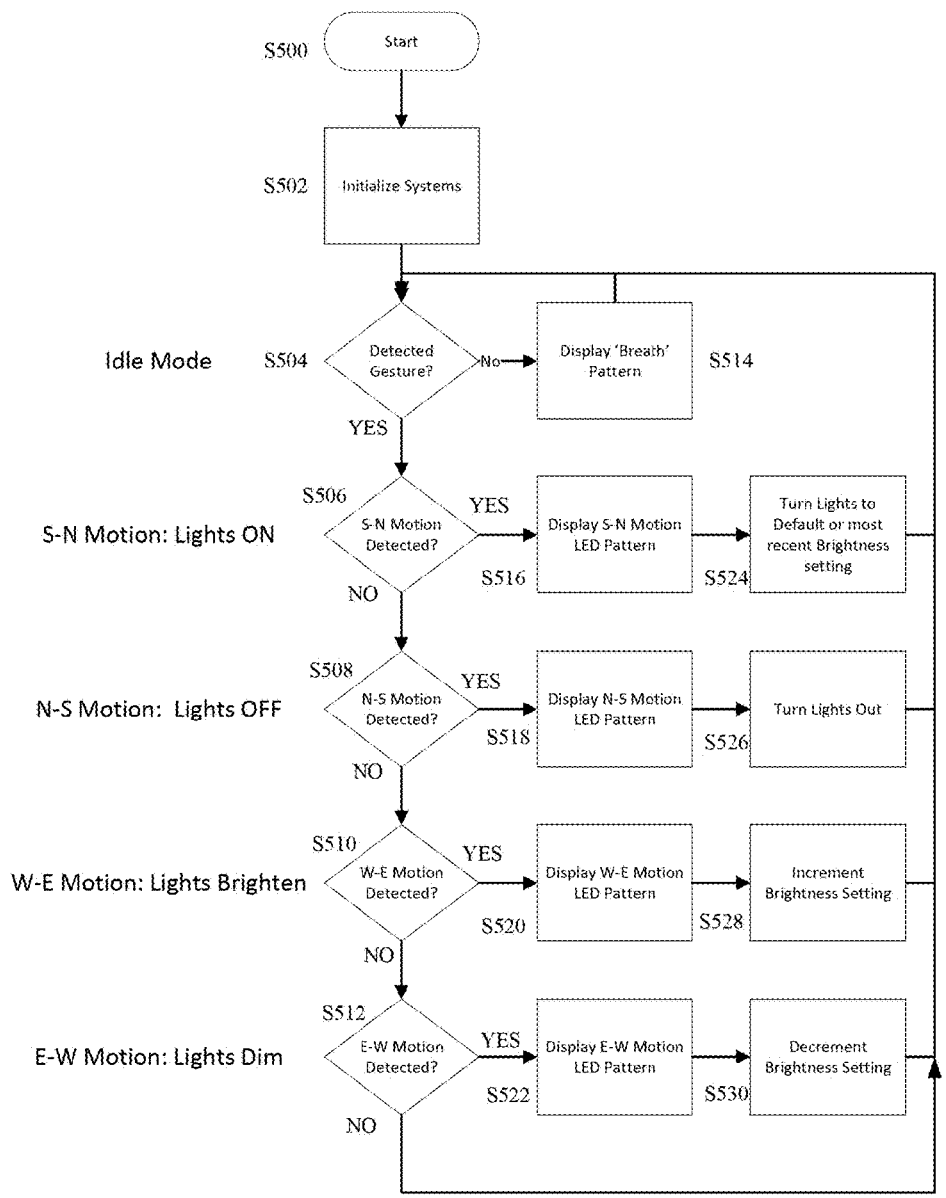
FIG. 5 is a flow chart illustrating examples of processes for user inputs and corresponding visual feedback executed in the lighting control system of FIG. 1.

FIG. 5 is a flow chart illustrating examples of processes for various user inputs and corresponding peripheral visual feedback in the lighting control system of FIG. 1, including network controller 106, luminaire 104, sensors 108, and lighting control device 102. The peripheral visual feedback includes light source patterns, for example, an array of LED patterns, which may be static such as checkers, sections or fills. Alternatively, the patterns may be animated such as single or symmetrical comets, pulses, fills, orbits, breathing, checker patterns, or any combination or superposition thereof. The visual light source feedback patterns are arranged to output light through the light transmissive area of the cover plate of the control pod along at least a portion of the outer perimeter of the cover plate, and provide confirmation of user gesture, touch, or voice input. In addition to visual feedback, the user of the system may also receive haptic and/or sound-based feedback to confirm the user input of a control command. In the processes of FIG. 5, a gesture, touch or voice input is detected by at least one of the user input responsive sensors 260. The detected input command is determined using a corresponding algorithm or firmware, for example, gesture recognition algorithm 242, voice recognition algorithm 239, or touch sensor firmware (not shown). After the input command is determined, a corresponding feedback pattern is selected for display using the animation database 236.

The process begins at S500 and moves to S502 where the lighting system is initialized by, for example, supplying power to the system, and the network controller 106 establishing a connection to a lighting control device 102 and luminaire 104 over a network in order to control at least one luminaire 104 directly or indirectly via the lighting control device 102, and to provide peripheral visible feedback that corresponds to the user input commands to control the at least one luminaire in the lighting system.

Figure 6:
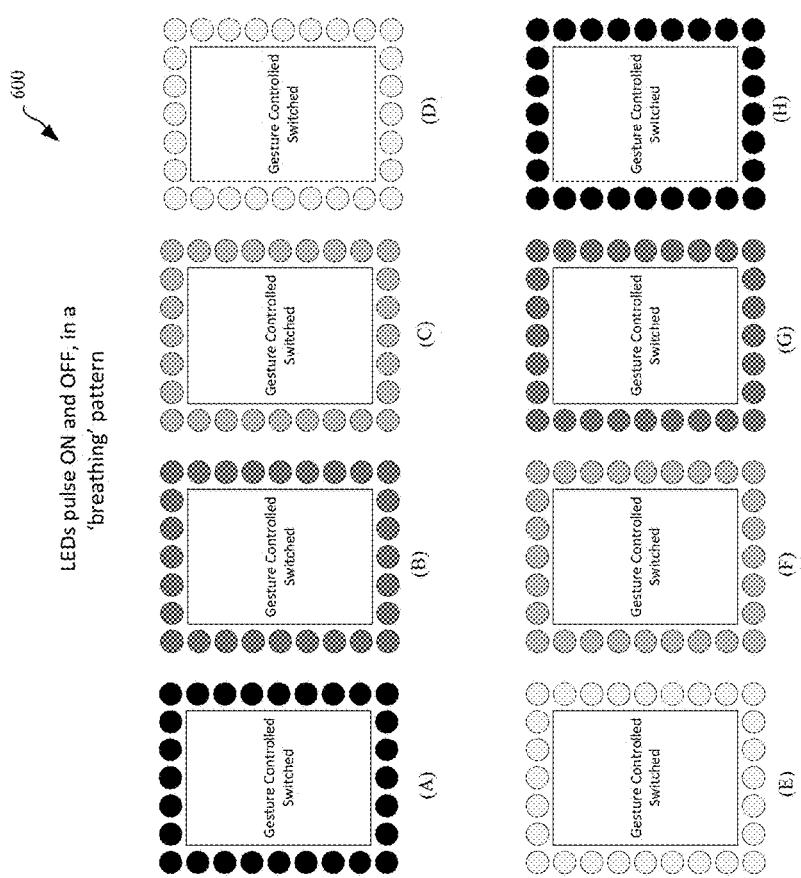
FIGS. 6-17 are examples of user inputs and LED patterns providing visual feedback in the lighting control system of FIG. 1.

At S504, after the system is initialized and device communication is established, the system enters an idle or sleep mode. The system remains in the idle or sleep mode until detection of a gesture input, which can be non-touch, touch, or audio. When no gesture is detected, the process moves to S514. At S514, light sources, for example, an array of LEDs controlled by a matrix type driver circuit, are arranged to illuminate in a pattern in the light transmissive area of a cover plate extending substantially along an substantial section of an outer perimeter of the cover plate 270. FIG. 6 illustrates a breathing pattern that may be used to provide peripheral visual feedback to a user that the system is in an idle mode of operation. As illustrated in FIG. 6, the array of LEDs appear to pulse or breath and progress from an OFF or dark state in (A), through increased levels of intensity or partial brightness levels in (B)-(D), to an ON or brighter state in (E), and from the brighter state in (E) through the partial bright state to the dark state illustrated by (F)-(H). The appearance of a full brightness of the LED light source in the pattern may not necessarily represent a full or maximum brightness level for the light source. The breathing pattern repeats for the duration of the idle or sleep mode of the system where, for example, during a sleep mode the LEDs appear to breathe slowly, while in an idle mode the LEDs may appear to breathe in a livelier manner.

Figure 7:
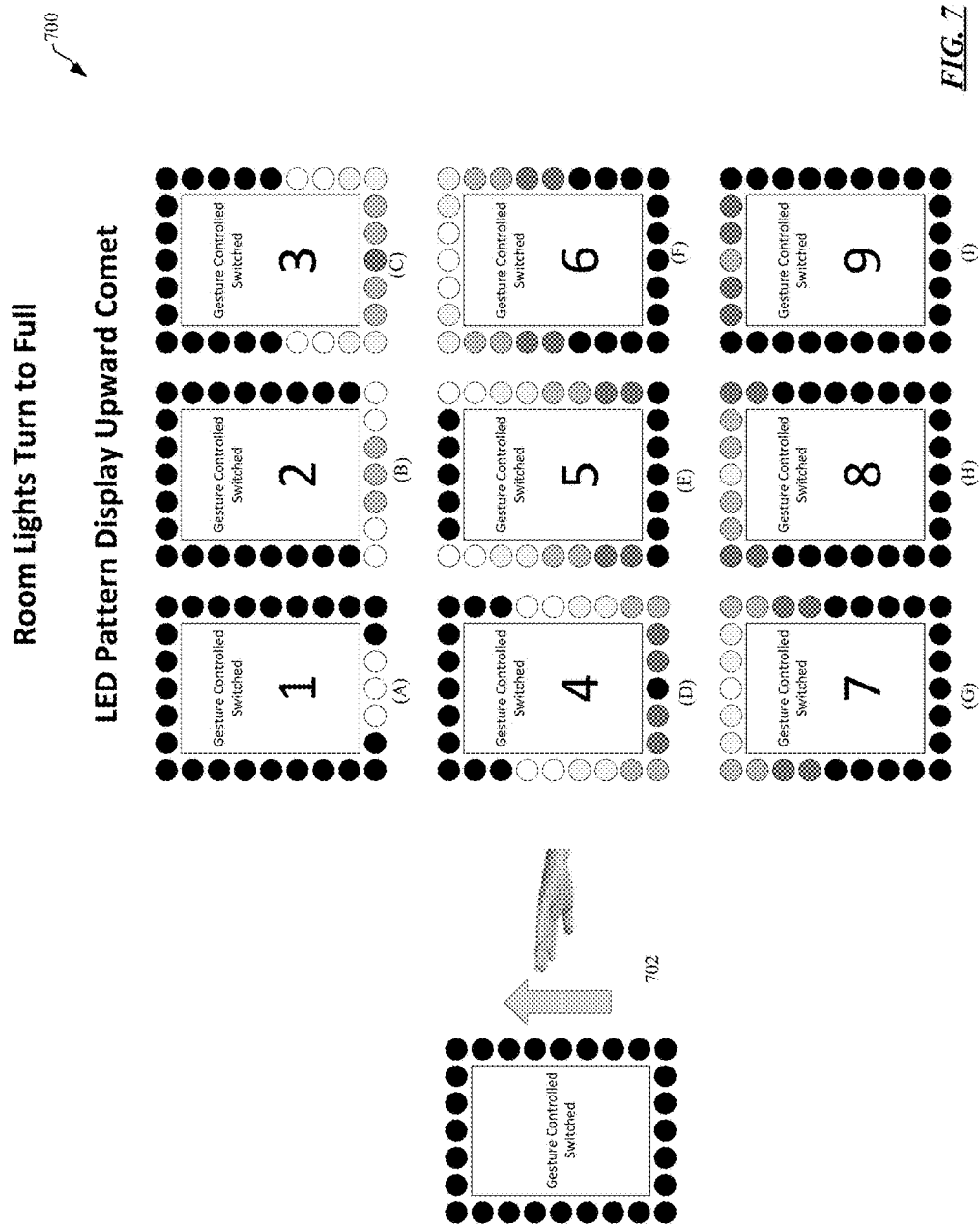

When a gesture or user input is detected at S504, the process moves to S506 where the function of the detected gesture is determined using the gesture recognition algorithm 242. If a south-to-north (S-N) motion is detected, the process moves to S516 where the S-N LED motion pattern is displayed, and at S524 the lights in the space are turned to a default or most recent brightness setting. FIG. 7 illustrates an example of a S-N hand gesture that may be used to turn lights in the space from OFF to ON. In FIG. 7, an animated symmetric comet pattern is illustrated as gesture example to provide feedback to the user to confirm the input function to turn the lights ON. As illustrated in (A)-(I) of FIG. 7, LEDs at a bottom portion of the cover plate have a brighter state that symmetrically moves, in opposite directions with respect to each other, from the lower center of the cover plate around the outer perimeter of the cover plate until reaching the upper center side opposite the starting side. As such, the light output from the LEDs moves approximately in parallel directions along the opposite portions of the outer perimeter of the cover plate. When the pattern for the S-N function to turn the lights ON is complete, and the lights in the area are switched to full brightness, the system returns to an idle mode in which, for example, a breathing pattern is displayed until a new gesture is detected. If, at S506, a S-N motion is not detected, then the process moves to S508.

Figure 8:
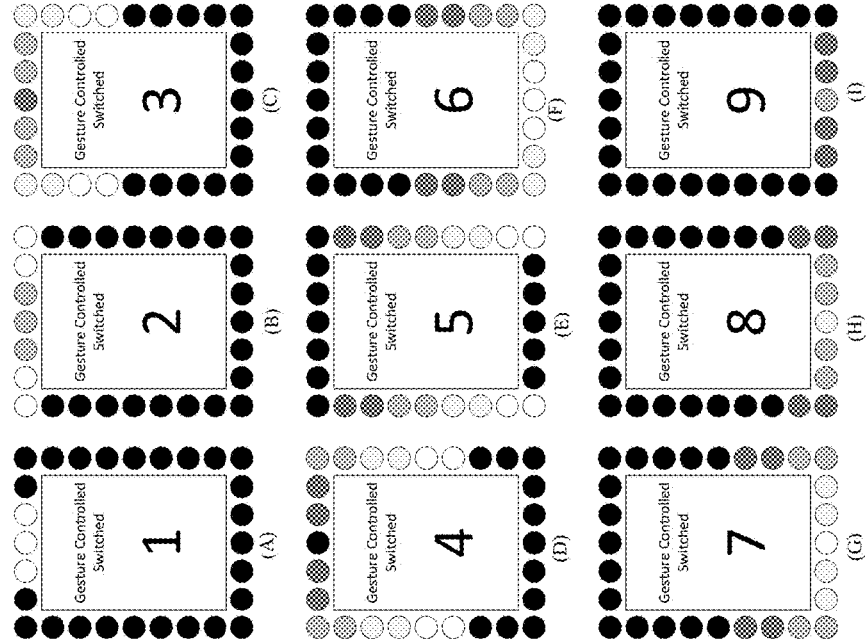
Figure 8:
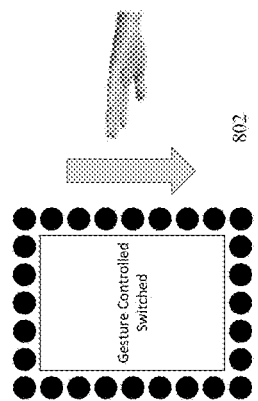

At S508, the detected gesture or motion is analyzed to determine whether a north-to-south (N-S) motion has been detected. If a north-to-south (N-S) motion is detected by at least one of the user input responsive sensors, then the process moves to S518 where the corresponding N-S user input feedback pattern from the animation database 236 is displayed to confirm the user input to turn the lights in the space OFF. After the N-S motion LED pattern is displayed around the outer perimeter of the controller, the process continues to S526 to implement the function of the user input to turn the lights OFF in the area. FIG. 8 illustrates an example of visual feedback pattern in which a downward comet pattern is used to confirm user input to turn lights OFF in the space or area. At 802, a downward hand gesture is made proximate the cover plate in which all of the LEDs along the perimeter of the cover plate are dark or OFF. To confirm the user input function, at (A)-(I) of FIG. 8, LEDs at an upper portion of the cover plate have a brighter state that symmetrically moves, in opposite directions with respect to each other, from the upper center of the cover plate around the outer perimeter of the cover plate until reaching the lower center side opposite the starting side. As such, the light output from the LEDs moves approximately in parallel directions along the opposite portions of the outer perimeter of the cover plate. When the pattern for the N-S function to turn the lights OFF is complete, and the lights in the area are switched OFF, the system returns to an idle mode in which the breathing pattern is displayed until a next gesture is detected. If, at S508, a N-S motion is not detected, then the process moves to S510.

Figure 9:
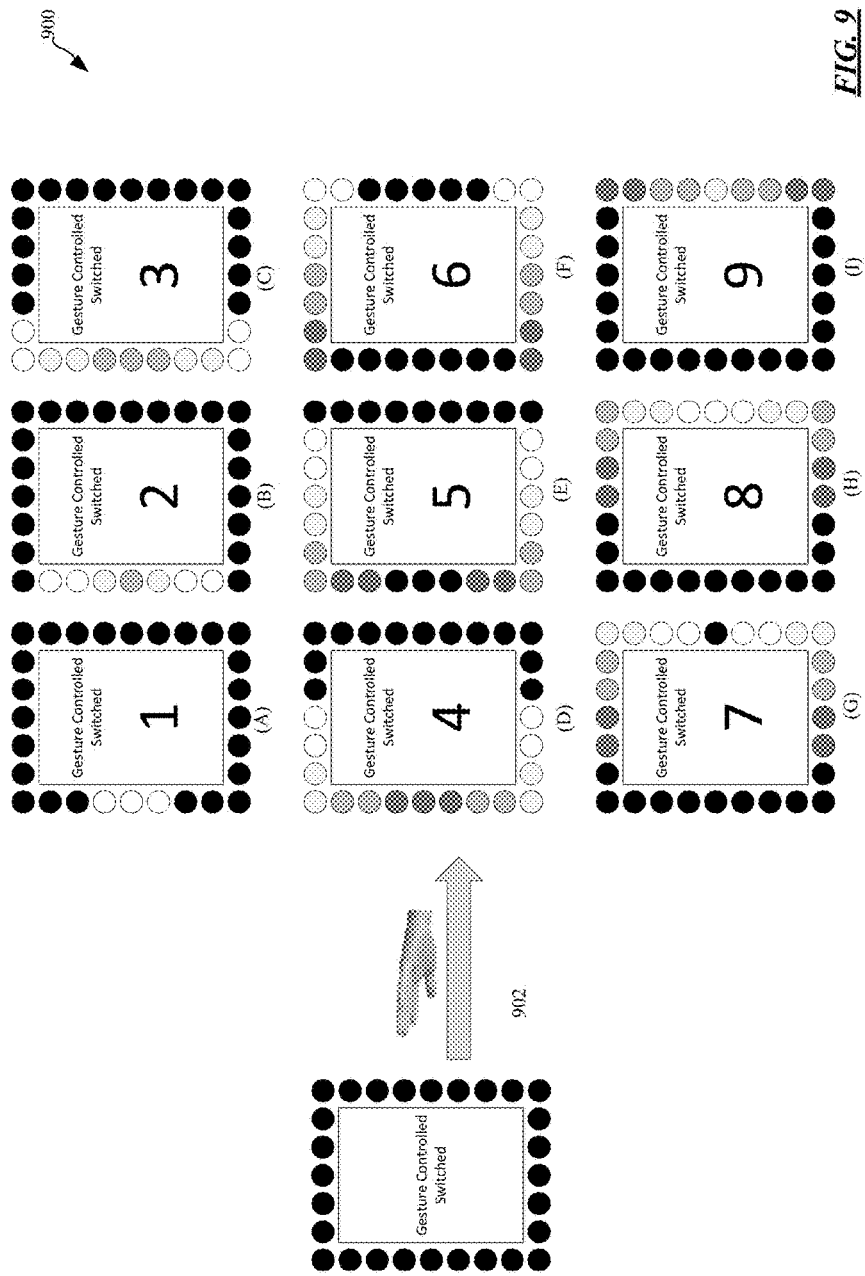

At S510, the detected gesture or motion is analyzed to determine whether a west-to-east (W-E) motion has been detected. If a west-to-east (W-E) motion is detected, then the process moves to S520 where the W-E user input feedback pattern is displayed to confirm the user input to increment the brightness setting of the lights in the space. After the W-E motion LED pattern is displayed around the outer perimeter of the cover plate, the process continues to S528 to implement the function of the user input to increment the brightness setting of lighting in the area. FIG. 9 illustrates an example of a visual feedback pattern in which a left-to-right comet pattern is used to confirm user input to increment a brightness setting of the lights in the space or area. At 902, a W-E hand gesture is made proximate the cover plate in which all of the LEDs along the outer perimeter of the cover plate are dark or OFF. To confirm the user input function, at (A)-(I) of FIG. 9, LEDs at a mid-center of the left side of the cover plate begin with a brighter state that symmetrically moves, in opposite directions with respect to each other, from the mid-center of the left side of the cover plate around the perimeter of the cover plate until reaching the mid-center of the right side of the cover plate opposite the starting side. As such, the light output from the LEDs moves approximately in parallel directions along the opposite portions of the perimeter of the cover plate from the starting dark level, to a brighter level, and back to the dark level. When the pattern for the W-E function to turn the lights OFF is complete, and the brightness setting of the lights in the area is incremented, the system returns to an idle mode in which, for example, the breathing pattern is displayed until a next gesture is detected. If, at S510, a W-E motion is not detected, then the process moves to S512.

Figure 10:
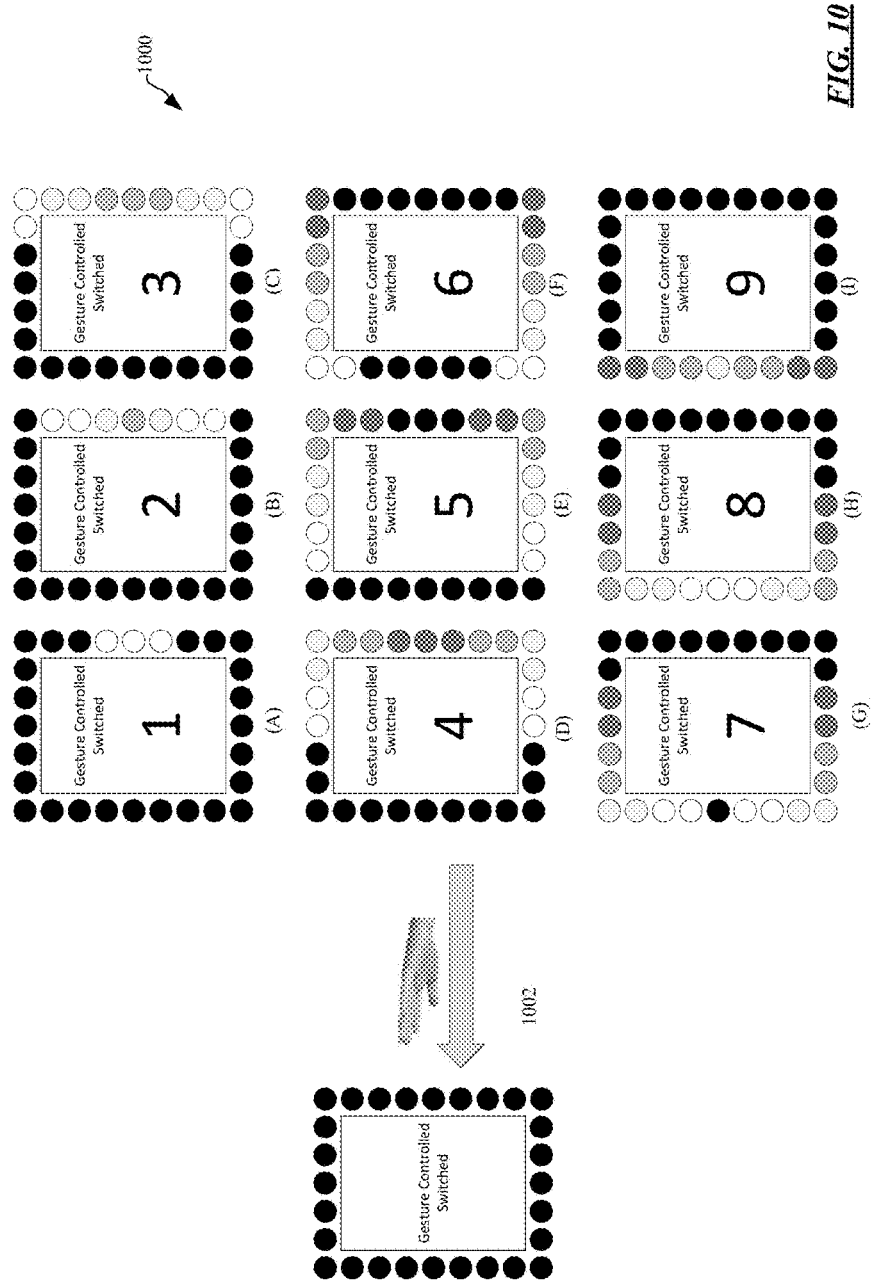

At S512, the detected gesture or motion is analyzed to determine whether a east-to-west (E-W) motion has been detected. If an east-to-west (E-W) motion is detected, then the process moves to S522 where the E-W feedback pattern is displayed to confirm the user input to decrease the brightness setting of the lights in the space. After the E-W motion LED pattern is displayed along the outer perimeter of the cover plate, the process continues to S530 to implement the function of the user input to decrement the brightness setting of lighting in the area. FIG. 10 illustrates an example of a visual feedback pattern in which a right-to-left comet pattern is used to confirm user input to decrement a brightness setting of the lights in the space or area. At 1002, a E-W hand gesture is made proximate the cover plate in which all of the LEDs along the perimeter of the cover plate are dark or OFF. To confirm the user input function, at (A)-(I) of FIG. 10, LEDs at a mid-center of the right side of the cover plate begin in a brighter state that symmetrically moves, in opposite directions with respect to each other, from the mid-center of the right side of the cover plate along the outer perimeter of the cover plate until reaching the mid-center of the left side of the cover plate opposite the starting side. As such, the light output from the LEDs moves approximately in parallel directions along the opposite portions of the perimeter of the cover plate from the starting dark level, to a brighter level, and back to the dark level. When the pattern for the E-W function to decrement the brightness setting of lights in the area is complete, and the brightness setting of the lights in the area is decremented, the system returns to an idle mode in which the breathing pattern is displayed until a new gesture is detected. If, at S512, a E-W motion is not detected, then the process returns to S5504. In the illustrated example, the system remains in the idle mode and displaying a breathing pattern until a next input gesture is detected or the system is powered OFF.

The above description of the processes of FIG. 5 have been used to provide examples of gesture motions to input control commands to an environmental control system. In another example, the sensed input control commands may be touch in which case, the user's touch on a surface of the control pod would be detected and command recognized based upon a configuration of the touch electrodes and associated firmware. Similarly, in an example of voice or audio input, the input voice or audio would be detected by a microphone of the input user responsive sensors. The detected voice or audio input may be processed using, for example, a preprogrammed set of instructions or accessible firmware or instructions or machine learning/artificial intelligence (AI) to determine the control command corresponding to the detected voice or audio input.

FIGS. 6-10 have been described above as non-limiting examples of visual feedback patterns that may be utilized to confirm a user input or environmental control command input proximate a surface of the cover plate over the controller of the lighting system of FIG. 1. The visual feedback patterns may alternatively be used to provide feedback for touch input on a surface of the control pod or voice or audio input. The visual feedback patterns are not meant to be limited to those described herein and may include other patterns of varied intensity, color or speed.

Figure 11:
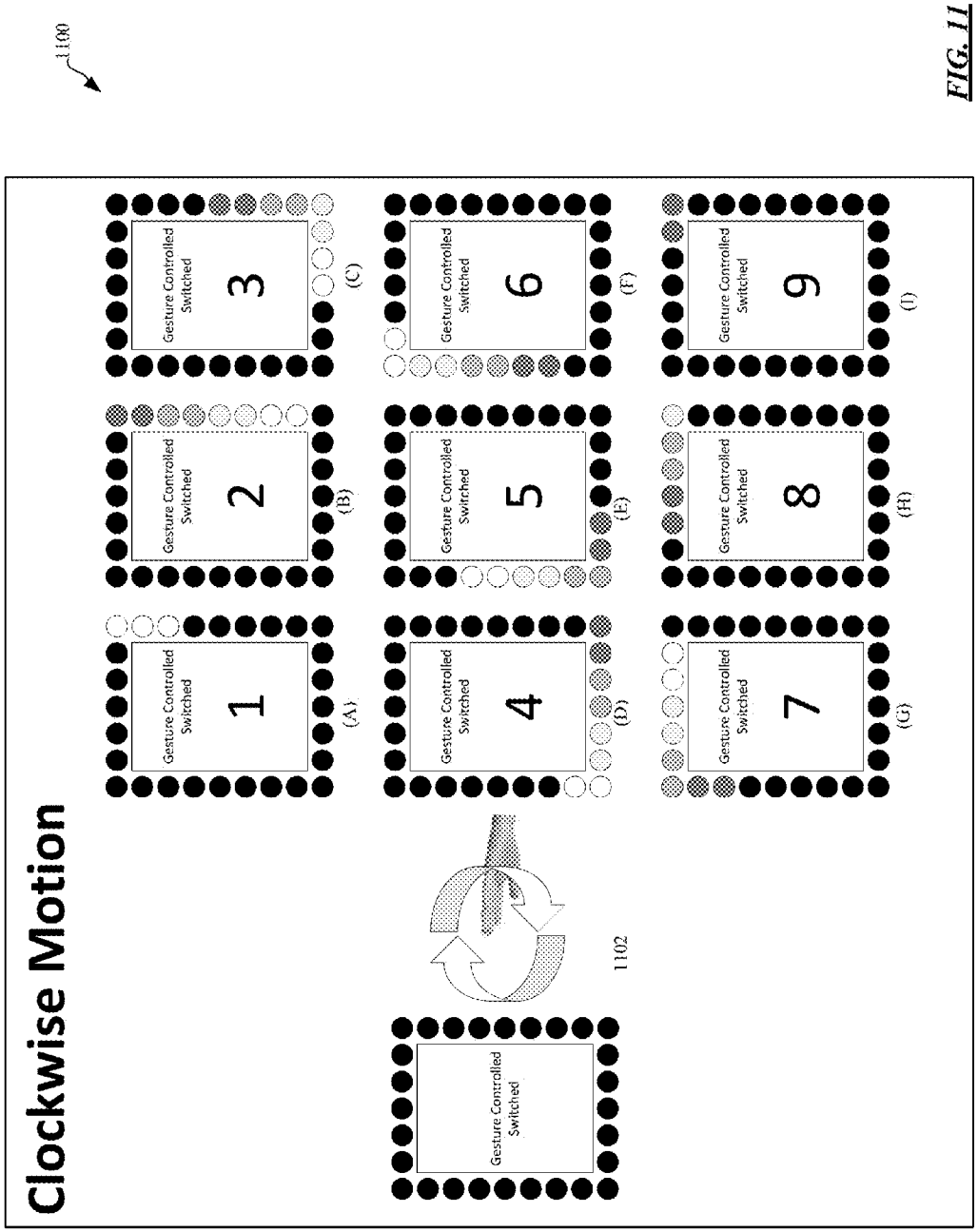

FIG. 11 is an example of an orbiting comet gesture that can be used to change or indicate a zone mode. The clockwise hand gesture at 1102 of FIG. 11 would not cause a change in the room lighting, i.e., would not cause implementation of a lighting function. Rather, the clockwise gesture would result in an LED feedback pattern in which the illuminated lights indicate a particular zone of the system. As illustrated in (A)-(I) of FIG. 11, the comet pattern moves in a clockwise orbit and then ends in a zone indication mode. The use of an orbit is a non-limiting example, and any gesture, touch or voice/audio input may be used by the user to perform predetermined functions of the system. For example, one or more touches in different quadrants, or touches of different magnitudes (e.g., tap and hold) may be used as touch command controls.

Figure 12:
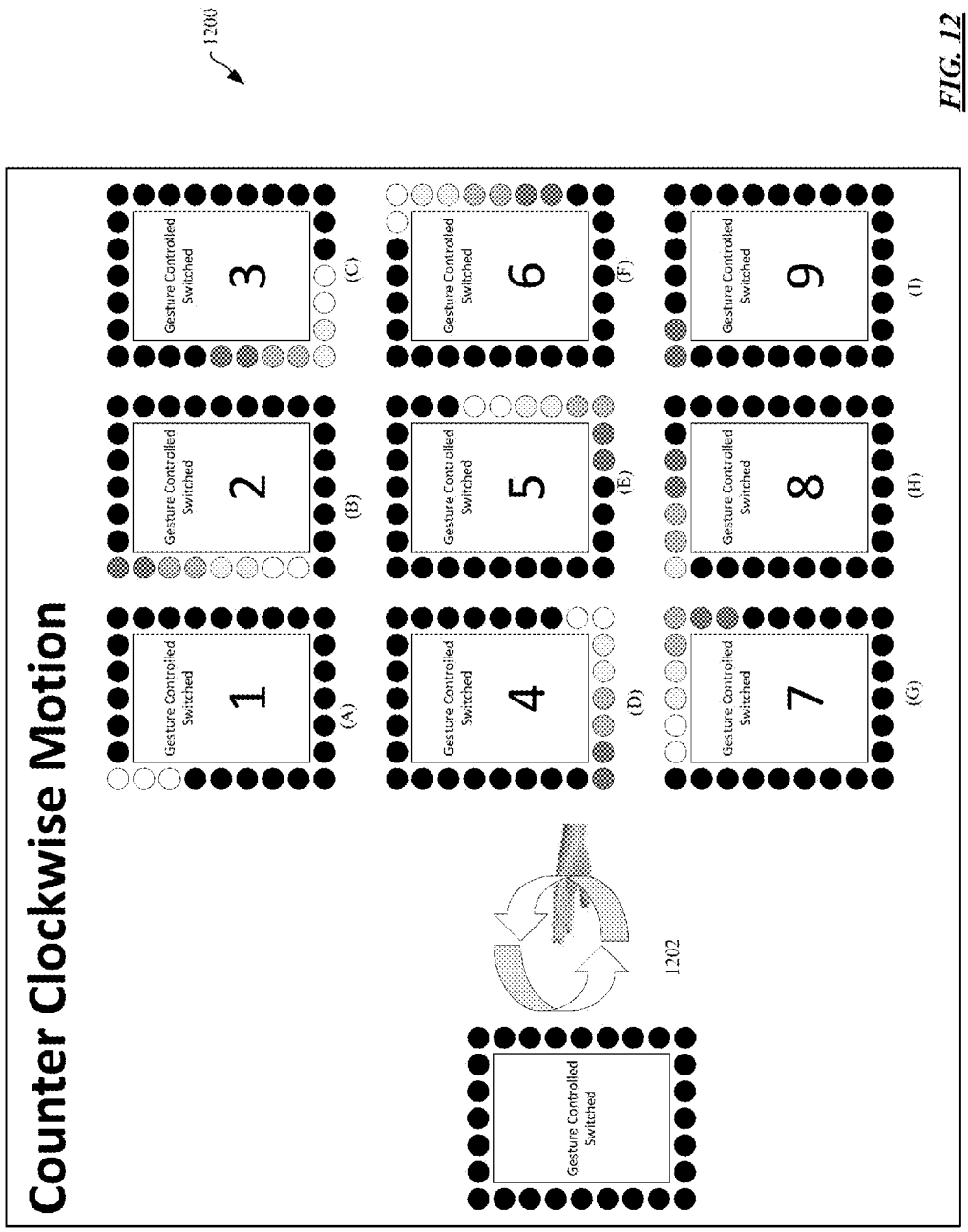

FIG. 12 is an example of an orbiting comet gesture that can be used to change or indicate a zone mode. The counter clockwise hand gesture at 1202 of FIG. 12 would not cause a change in the room lighting. i.e., would not cause implementation of a lighting function. Rather, the counter clockwise gesture would result in an LED feedback pattern in which the illuminated lights indicate a particular zone of the system. As illustrated in (A)-(I) of FIG. 12, the comet pattern moves in a counter clockwise orbit, and then ends in a zone indication mode. Similar to stated above with respect to FIG. 11, the use of an orbit is a non-limiting example, and any gesture, touch or voice/audio input may be used by the user to perform predetermined functions of the system. For example, one or more touches in different quadrants, or touches of different magnitudes (e.g., tap and hold) may be used as touch command controls.

Figure 13:
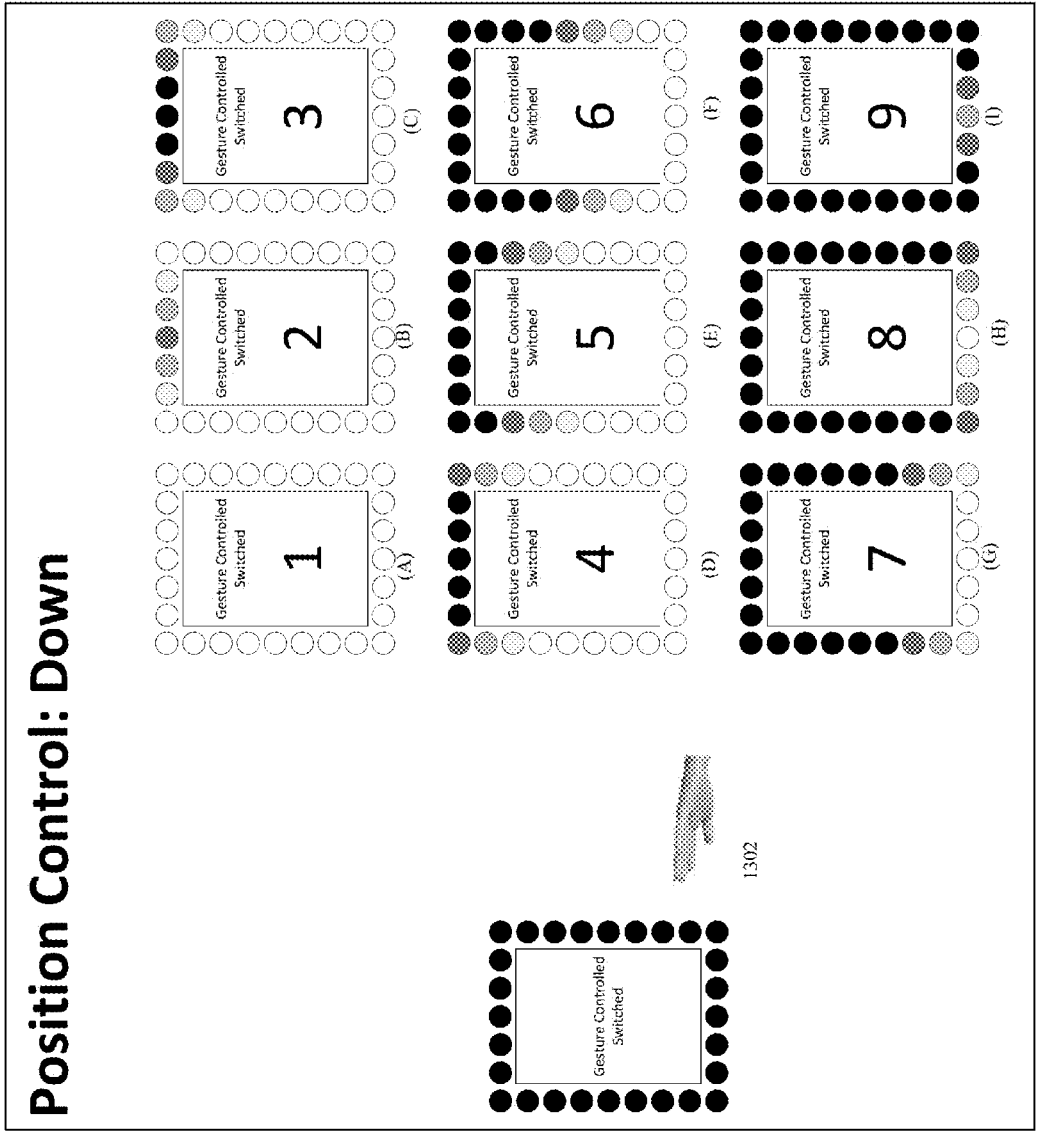

FIG. 13 is an example of gesture input for an animation fill pattern that can be used to gradually reduce the brightness of lighting in a space. The hand gesture to implement the lighting function and the visual feedback pattern is to hold the hand proximate a front and above center of the cover plate until the desired decreased brightness level is achieved. The LED feedback patterns (A)-(I) of FIG. 13 illustrate the decreased intensity level of individual LEDs to indicate the decreased brightness level for the lighting in the space. In another example, touch input may be used as the control command input to implement the animation fill pattern and end device control function, in which one or more touches in different quadrants, or touches of different magnitudes (e.g., tap and hold) may be used as touch command control inputs to perform a predetermined function of the system. For example, a bottom surface of the control pod can be touched to indicate a control command to decrease the brightness level for the lighting in the space.

Figure 14:
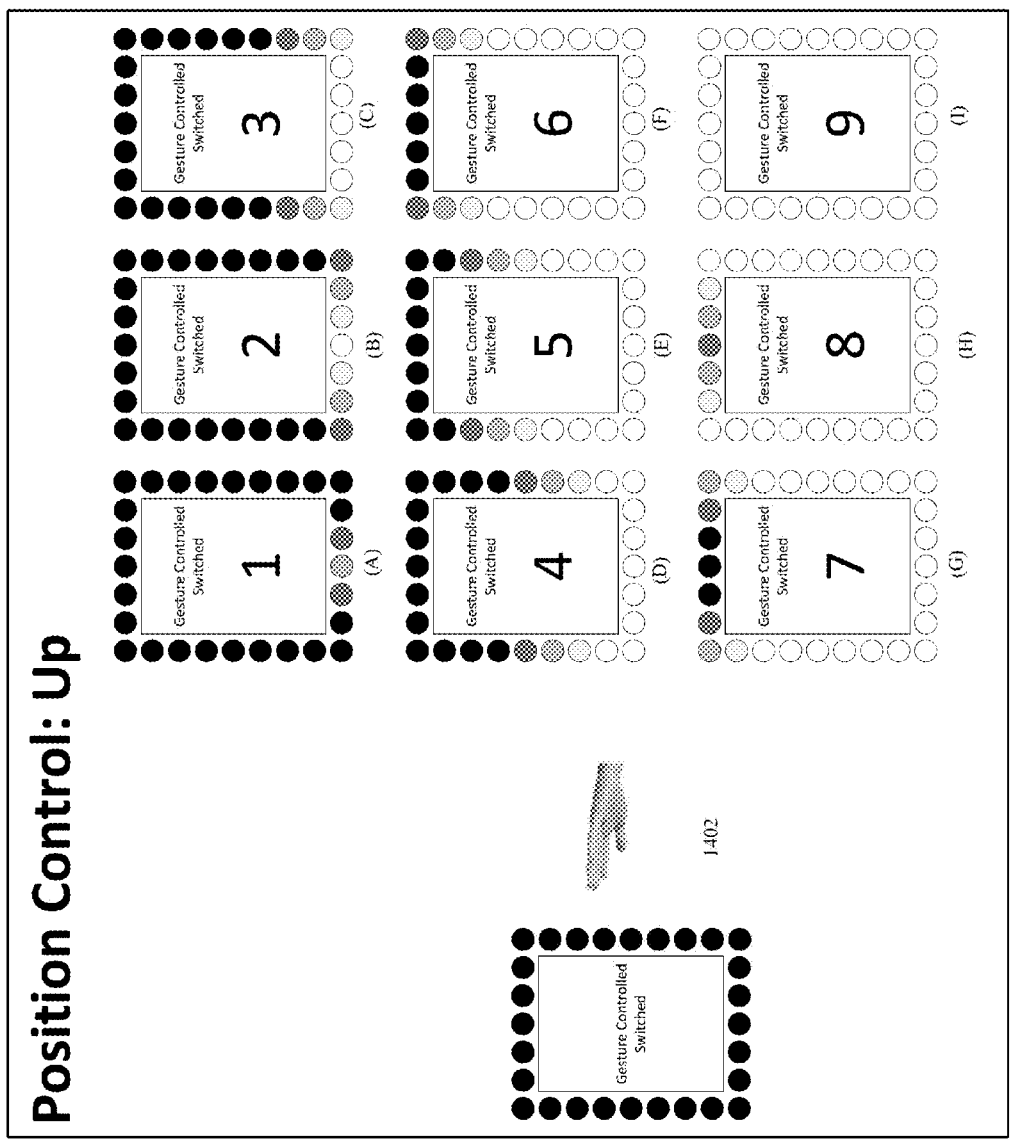

FIG. 14 provides an example of gesture input for an animation fill pattern that can be used as the reverse of FIG. 13 to gradually increase the brightness of lighting in a space. The hand gesture to implement the lighting function and the visual feedback pattern is to hold the hand proximate a front and below center of the cover plate until the desired increased brightness level is achieved. The LED feedback patterns (A)-(I) of FIG. 14 illustrate the increased intensity level of individual LEDs to indicate the increased brightness level for the lighting in the space. In another example, touch input may be used as the control command input to implement the animation fill pattern and end device function, in which one or more touches in different quadrants, or touches of different magnitudes (e.g., tap and hold) may be used as touch command control inputs to perform a predetermined function of the system. For example, a top surface of the control pod can be touched to indicate a control command to increase the brightness level of the lighting in the space.

Figure 15:
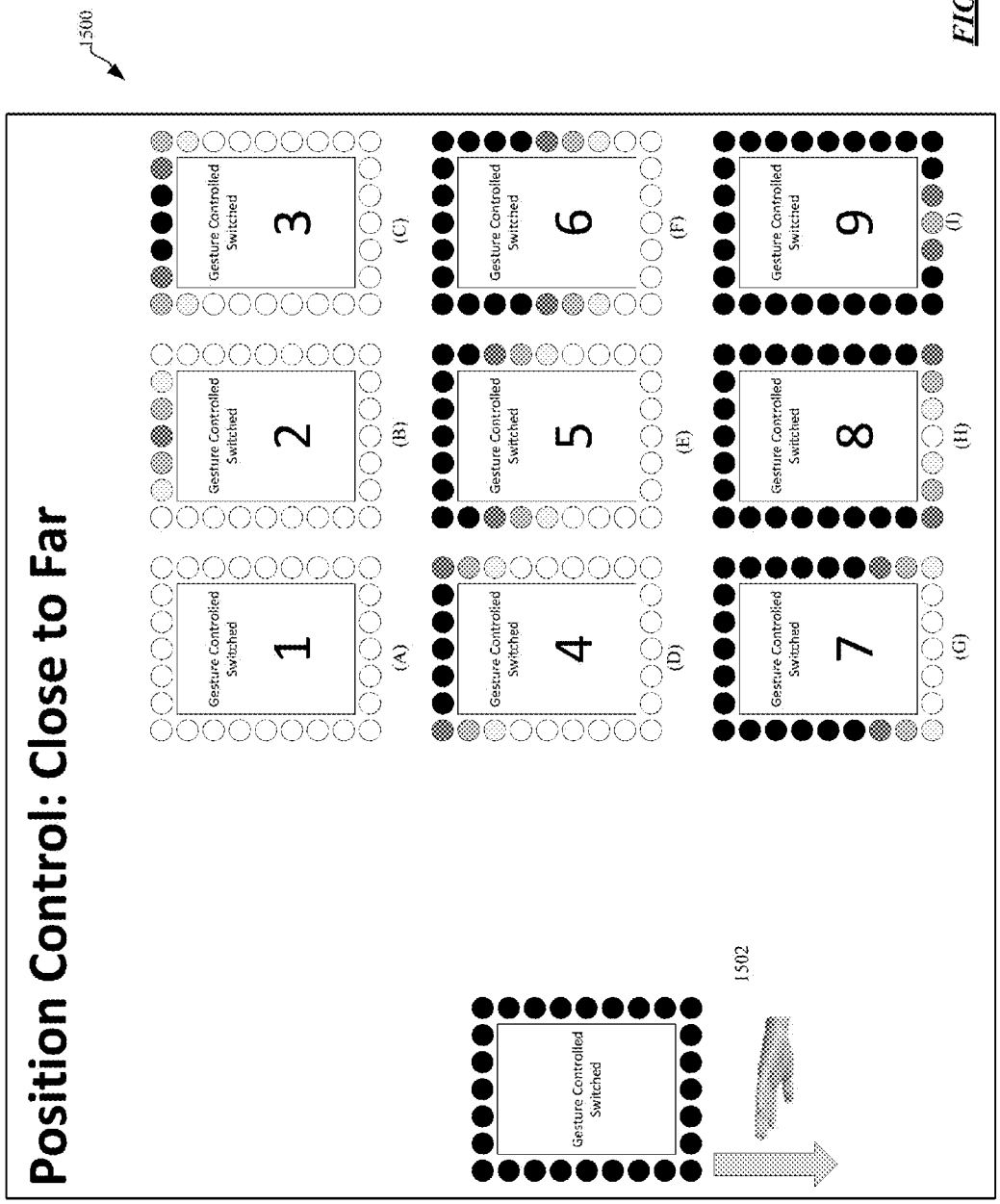

FIG. 15 provides another example of gesture input for an animation fill pattern that can be used to gradually reduce the brightness of lighting in a space by position control. The hand gesture to implement the lighting function and a resulting visual feedback pattern is to hold the hand close in front of and at a center of the cover plate, and then pull the hand away from the cover plate. The intensity of the lighting is reduced until the hand is removed from the front of the cover plate. The LED feedback patterns (A)-(I) of FIG. 15 illustrate the reduced intensity level of individual LEDs to indicate the decreased brightness level for the lighting in the space.

Figure 16:
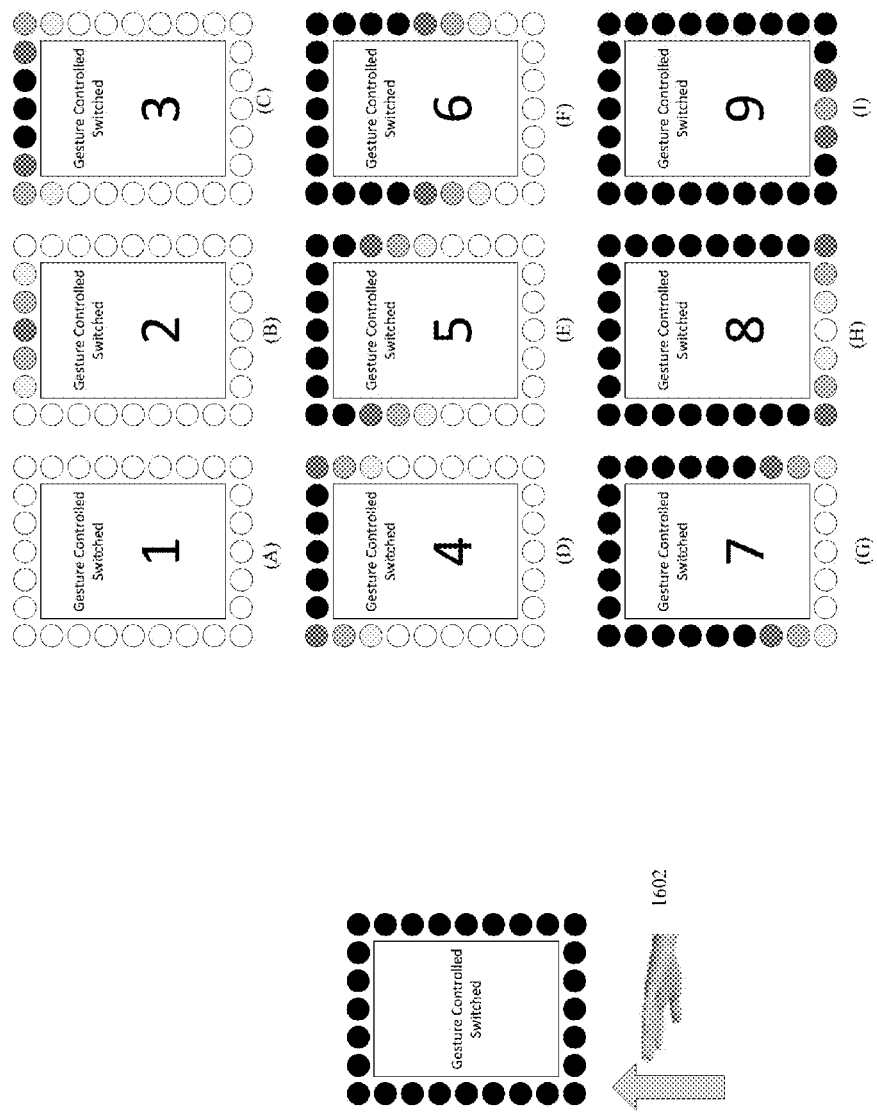

FIG. 16 provides another example of gesture input for an animation fill pattern that can be used to gradually reduce the brightness of lighting in a space by proximity control. The hand gesture to implement the lighting function and a resulting visual feedback pattern is to hold the hand in front of and at a center of the cover plate, and then push the hand closer towards the cover plate. The intensity of the lighting in the space will gradually decrease until the hand it completely removed. The LED feedback patterns (A)-(I) FIG. 16 illustrate the reduced intensity level of individual LEDs to indicate the decreased brightness level for the lighting in the space.

Figure 17:
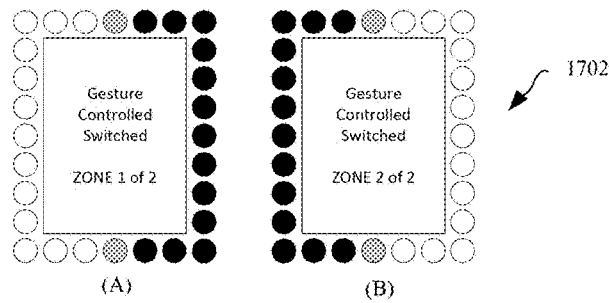
Figure 17:
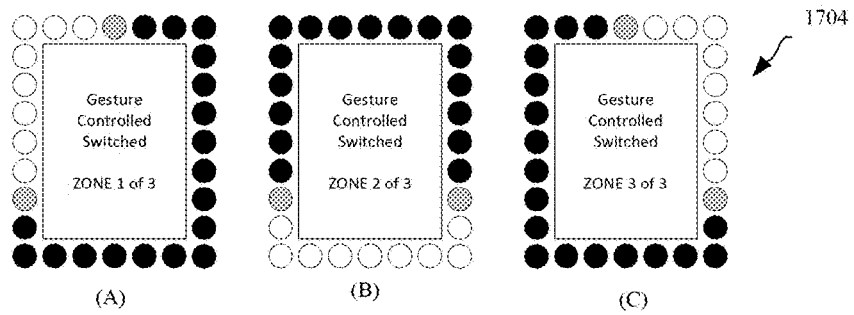
Figure 17:
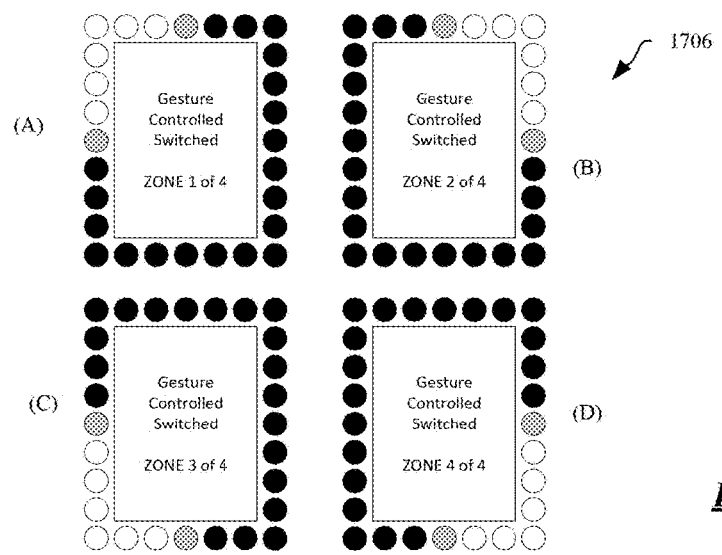

FIG. 17 illustrates an example of peripheral visual feedback patterns to indicate zones of lighting in a multi-zone system. Multiple zones can be used, for example, in BMS to control functions in different spaces or different function within the same space. In stated above, the example of gesture input is a non-limiting example, and touch input or voice or audio input may also be as control command input on or near the surface of the control pod. Any lighting intensity, pattern or colors may be used to differentiate the zones. In the example of FIG. 17, a first zone may be used for lighting control, and a second zone may be used for HVAC control. In FIG. 17, 1702 provides an example of state indication for two zones in which a Zone 1 is located at (A) and a Zone 2 is located at (B). An array of LEDs is arranged along the outer perimeter of the cover plate to provide visual feedback to confirm the respective zones. In (A), the LEDs are illuminated/bright on a left side and dark on a right side to indicate Zone 1 of 2. In contrast for the two zone example of 1702, in (B), the LEDs are illuminated/bright on a right side and dark on a left side to indicate Zone 2 of 2.

A three zone example is provided at 1704. As illustrated at (A), substantially a left upper portion of the cover plate is illuminated/bright and the remaining LEDs are dark to indicate Zone 1 of 3. At (B), LEDs at a lower portion of the cover plate are illuminated/bright and the remaining LEDs are dark to indicate Zone 2 of 3. And, at (C), substantially a right upper portion of the cover plate is illuminated/bright and the remaining LEDs are dark to indicate Zone 3 of 3.

A four zone example is provided at 1706. As illustrated at (A), an upper left corner portion of LEDs of the cover plate is illuminated/bright and the remaining LEDs are dark to indicate Zone 1 of 4. At (B), substantially an upper right side of the LEDs of the cover plate is illuminated/bright and the remaining LEDs are dark to indicate Zone 2 of 4. At (C), a lower left corner portion of LEDs of the cover plate is illuminated/bright and the remaining LEDs are dark to indicate Zone 3 of 4. And, at (D), a lower right corner portion of LEDs of the cover plate is illuminated/bright and the remaining LEDs are dark to indicate Zone 4 of 4.

Figure 18:
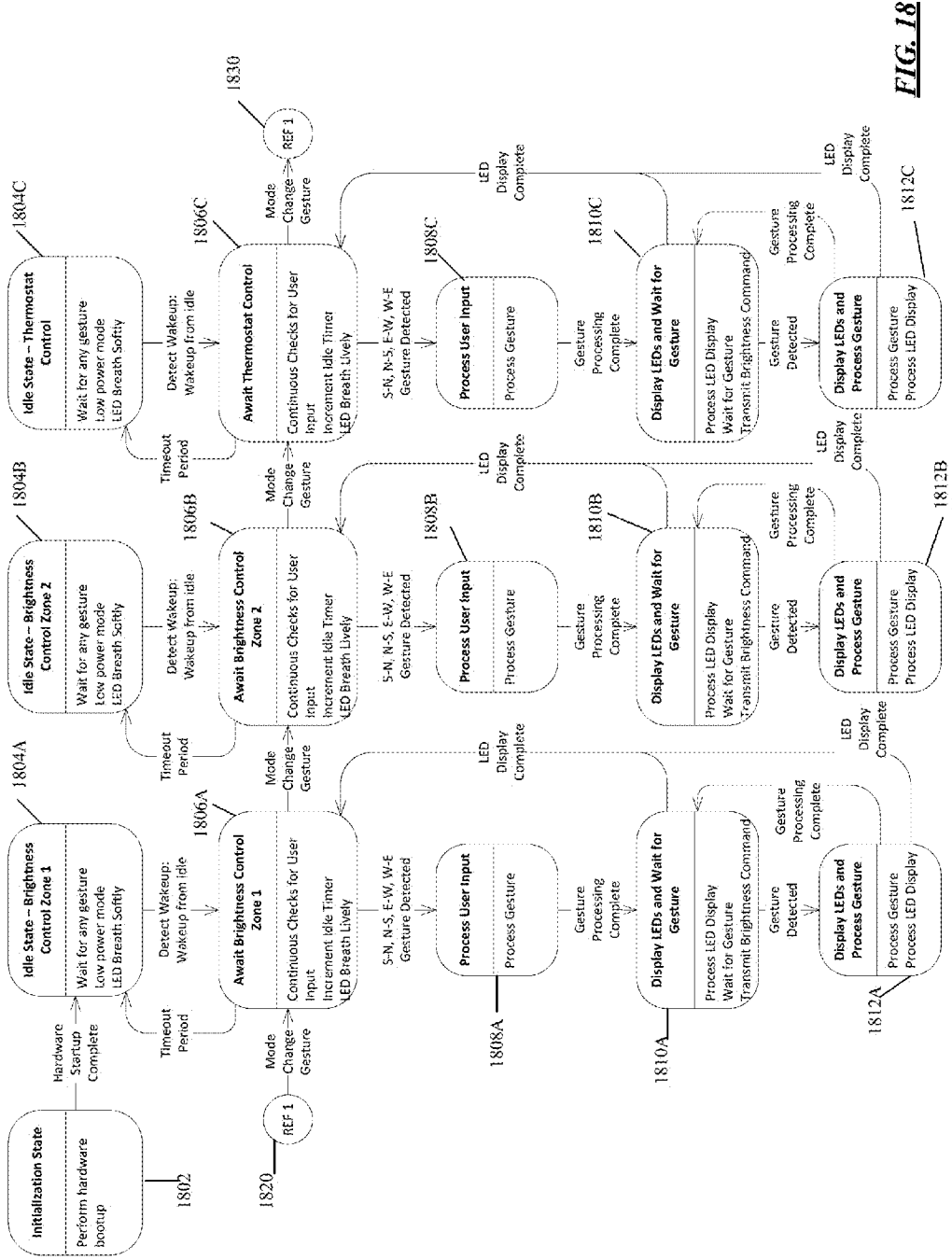
FIG. 18 is a state diagram illustrating the processes of multiple control zones in the lighting control system of FIG. 1.

FIG. 18 is a state diagram illustrating various process controls and inputs that can be used for multiple control zones in, the non-limiting example for the lighting control system of FIG. 1. The system of FIG. 18 functions similar to the processes described in FIG. 5; however, the system is modified to include multiple control zones that can be used, for example, with building management systems to monitor and control a variety of device functions such as lighting control, HVAC control, thermostat or humidifier control, water flow or pressure, emergency shut off/on, facility access and security, or home appliance control such as microwave oven or cooking device control, laundry washers or dryers, or audio system control. For simplicity, the descriptions of examples for detected gestures such as S-N, N-S, E-W, and W-E will not be repeated here.

The process begins at S1802. During the system initialization step, power is supplied to the system components and the hardware and software is initialized. The process moves to S1804A (Control Zone 1).

At 1804A-C, hardware connections and communication links between the network controller, lighting control device and luminaires are established, and each control zone enters a low power, idle state to await detection of at least one of non-touch, touch or audio input near or on the surface of the cover plate of the controller. By default, the status of Control Zone 1 in the idle state may be displayed as a slow repetitive breathing pattern in the light transmissive area of the cover plate extending along a substantial section of an outer perimeter of the cover plate. As discussed above, FIG. 6 illustrates an example of a breathing pattern to provide confirmation and visual feedback of the low power, idle state for the control zone. To ascertain the other zones on the system, at 1820 or 1830, a mode change input, for example, a gesture, touch or audio control command may be input by the user to switch between the zones on the system. For example, as illustrated in FIGS. 11 and 12, a clockwise or counter clockwise orbiting hand gesture can be used as user input to switch or confirm a status of a zone. When the orbiting hand gesture is detected by the user input responsive sensor 260, a light output is provided through the light transmissive area of the cover plate as visible feedback to the user and corresponds to the detected control command to switch zones.

The control zones remain in an low power, idle or sleep state until there is a gesture to Wake the system. Any gesture, touch or audio input can be used to Wake the system. At 1806A-C, a visual feedback pattern to confirm the state change from sleep or idle to Wake is displayed as a lively breathing pattern in the light transmissive area located along the outer perimeter of the cover plate over the network controller 106. During the Wake state, the user input responsive sensors continuously check for user input for a predetermined period of time, for example, about two minutes. The period of time that the system remains in the Wake mode is variable and based upon factors such as the type of power source being used, how many LEDs are being powered, brightness of the LEDs, etc. The period of time to Wake mode before returning to a power save or low power mode may be set during installation of the system and can be changed by the user thereafter based upon the needs of the system. If no gesture input is detected within the predetermined period of time, the control zone will return to a low power sleep or idle state in which the peripheral visual feedback pattern is displayed as a slow or soft breathing pattern in the light transmissive area along at a portion of the perimeter of the cover plate. The system will again remain in the idle state with a repetitive slow breathing pattern displayed in the light transmissive area until a wake-up gesture is detected.

If during the Wake state at 1806A-C, a process user input such as a south-to-north (S-N), north-to-south (N-S), east-to-west (E-W), or west-to-east (W-E) control command, described above, is detected, then a state of the system moves to 1808A-C.

At 1808A-C, the detected user input is processed by a processor coupled to the controller to respond to data corresponding to the user inputs detected by the user input responsive sensors. After processing, at 1810A-C, the processor sends a signal to a driver circuit, for example, a matrix driver connected to an array of LEDs coupled to the light transmissive area extending along the outer perimeter of the cover plate, to control the array of LEDs to selectively provide a light output through the light transmissive area of the cover plate for a period of time following the detection of the process user input at 1806A-C. The processor also transmit a signal to the end device to implement a function corresponding to the detected control command. After the visual feedback pattern is displayed in the light transmissive area of the control pod, and the signal is transmitted to implement the lighting or other function corresponding to the detected control command, the state of the system moves to 1812A-C if a new gesture is immediately detected, or the state of the system returns to 1806A-C to await a next gesture input. The state of the system toggles between 1810A-C and 1812A-C as long as there is a next gesture input detected, processed, displayed in the light transmissive area along at least the outer perimeter of the cover plate, and the function corresponding to the process user input implemented in the end device of the system.

The state of the system remains in the Wake state at 1806A-C for the predetermined period of time to await a next gesture input. During the Wake state, a lively breathing pattern of LEDs may be illuminated through a section of the light transmissive area of the cover plate. If the predetermined period of time expires and there is no new process user input received, then the state of the system moves to a low power, idle or sleep state at 1804A-C. During the low power, idle state, the repetitive slow or softly breathing LED pattern is illuminated through a section of the light transmissive area of the cover plate to provide visual feedback to the user of the system that the system is powered ON and waiting for an input.

From the discussions above, it will be apparent that many of the processing and control functions of the control pod providing lighting or other control and visible feedback, in response to user inputs may be implemented in part by utilizing firmware or software, for example, using executable instructions of a program and/or data for receiving a sensor signal responsive to a user input of an environmental control command in a vicinity of a cover plate of a controller, processing the received sensor signal to detect the environmental control command, and based upon the detected environmental control command, controlling a light source to selectively provide visible feedback in the form of a selective light output through a light transmissive area of a control pod at least along a portion of the outer perimeter of the cover plate, where the selective light output corresponds to the detected environmental control command, implemented in a network controller 106 of the control pod 105 (e.g. as shown in FIGS. 1, 2A, 5 or FIG. 18). The programming and associated data typically is stored in memory of the control pod for use by the processor of the control pod. The programming and/or data, however, may be loaded into the control pod via a local connection at installation or via a network (e.g. for a firmware update). For such loading of programming or data, the programming or data may be stored on a server, computer, mobile device or the like.

A network or host computer platform, as may typically be used to generate and send programming or data for installation or updates includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. In general, the hardware elements, operating systems and programming languages of such servers may be conventional in nature. Of course, the server functions may be implemented in a distributed fashion on a number of similar platforms, to distribute the processing load.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs. The hardware platform of a network computer or of a terminal computer may use a RAM type main memory and a hard disk drive for mass storage of data and programming, whereas the network controller of FIG. 2A includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs. The mobile device typically uses a touchscreen type display, where the display is controlled by a display driver, and user touching of the screen is detected by a touch sense controller. In general, the hardware elements, operating systems and programming languages of such computer and/or mobile user terminal devices also are conventional in nature.

As also outlined above, aspects of the operation of a control pod including the example network controller 106 and any system interaction therewith, may involve some programming of the control pod. Program or data aspects of the technology discussed above therefore may be thought of as "products" or "articles of manufacture" typically in the form of executable programming code (firmware or software) or data that is carried on or embodied in a type of machine readable medium. This programming and/or control data is configured to implement operation of the control pod, including to implement operation states and/or provide visible feedback in one or more of the ways described above.

"Storage" type media include any or all of the tangible memory of lighting devices, computers, user terminal devices, intelligent standalone sensors, processors or the like, or associated modules thereof, such as various volatile or non-volatile semiconductor memories, tape drives, disk drives and the like, which non-transitory devices may provide storage at any time for executable software or firmware programming and/or any relevant data or information. All or portions of the programming and/or configuration data may at times be communicated through the Internet or various other telecommunication networks. Such communications, for example, may enable loading of the data or programming from one computer or processor into another, for example, from a management server or host computer of a lighting system or building management system (BMS) type service provider into any of the control pods 105 or other non-control-system devices, etc. Thus, another type of media that may bear the programming or data elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The programming or data for control and visible feedback may be embodied in at least one machine readable medium, one or more of which may be non-transitory. For example, if downloaded to a network controller 106 of a control pod 105 the programming or data could be stored in a hardware device that serves as the memory/storage 235 of the network controller 106. The memory/storage 235 is an example of a non-transitory type of media. By way of another example, at times, executable operational programming, including programming and/or data for the states and visible feedback of the control pod, may reside in the memory/storage of a server or user terminal device and be streamed over the network medium to the control pod 105 In these later examples, the signal(s) on the network would be transitory in nature. However, the buffer memory and any memory or registers internal to the processor memory, or any hardware storage device used by the server or other computer to maintain the programming and any data or to prepare selected programming or data for transmission over the network would be additional examples of non-transitory media It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A control pod, comprising;
    a controller; and
    a cover plate configured to cover the controller when the control pod is mounted on or recessed into an architectural structure in a space, the cover plate consisting of:
        a single, continuous surface, wherein the surface is exposed and entirely accessible for user inputs within the space; and
        a light transmissive area extending along a substantial section of an outermost perimeter of the continuous surface of the cover plate;
    wherein the controller comprises:
        a user input responsive sensor;
        a selectively controllable light source coupled to the light transmissive area substantially along the outer perimeter of the surface of the cover plate;
        a driver circuit coupled to drive the light source to selectively emit light through points of the light transmissive area around the outermost perimeter of the surface of the cover plate;
        a transmitter circuit, configured to transmit control signals to operate a device configured to control an environmental condition in the space; and a processor coupled to respond to data corresponding to user inputs sensed by the user input responsive sensor, coupled to control the light source via the driver circuit and coupled to the transmitter circuit, the processor being configured to:
- detect the user inputs of a control command based on a user action detected via the user input responsive sensor; and based on the detected control command:
  - cause the transmitter circuit to send a control signal to the device to implement a function corresponding to the detected control command; and
  - control the light source via the driver circuit to selectively provide a light output through the light transmissive area of the continuous surface of the cover plate for a period of time following control command detection, as visible feedback corresponding to the detected control command, for observation by the user, along at least a portion of the section of the light transmissive area of the continuous surface of the cover plate.

2. The control pod of claim 1, wherein:
the processor is further configured to control the light source via the driver circuit to selectively provide a light output though the section of the light transmissive area of the cover plate to provide a simulated movement of a point of light output along at least the portion of the outer perimeter of the cover plate; and
the simulated movement corresponds to the detected control command.

3. The control pod of claim 2, wherein:
the processor is further configured to control the light source via the driver circuit to selectively provide another light output though the section of the light transmissive area of the cover plate to provide simulated movement of another point of light output along at least the outer portion of the perimeter of the cover plate; and
the simulated movement of the other point of light output also corresponds to the detected control command.

4. The control pod of claim 3, wherein, during the simulated movements of the points of light outputs, the points of light output have a different light intensity from the simulated movement of other points of light output, and one point appears to follow the other point.

5. The control pod of claim 1, wherein:
the processor is further configured to control the light source via the driver circuit to selectively provide a light output though selected portions of the light transmissive area of the cover plate for the period of time, to provide a static pattern of points of light output along at least the section of the light transmissive area of the cover plate; and
the static pattern of points of light output corresponds to the detected control command.

6. The control pod of claim 1, wherein:
the cover plate further includes a shoulder along a portion of the outermost perimeter of the cover plate, the shoulder extending away from a plane of the surface of the cover plate;
the light transmissive area is formed through the shoulder around the outermost perimeter of the exposed surface of the cover plate; and
the light source is configured to selectively emit light sideways through the light transmissive area through the shoulder and at least partially onto regions of the architectural structure around the cover plate.

7. The control pod of claim 1, wherein:
the light transmissive area is formed through peripheral regions of the surface, along the outermost perimeter of the cover plate; and
the light source is configured to selectively emit light forward through the light transmissive peripheral regions of the surface, along the outer perimeter of the cover plate into the space.

8. The control pod of claim 1, wherein:
the light source comprises light emitting diodes (LEDs) coupled to emit light through the light transmissive area at the points around the outermost perimeter of the cover plate; and
the driver circuit comprises a matrix driver connected to the LEDs.

9. The control pod of claim 1, wherein:
the user input responsive sensor comprises:
  touch sensing electrodes; and
  a driver and sensing circuit coupled to the touch sensing electrodes and the processor; and
the processor is configured to detect the user input of the control command in response to sensing of a predetermined touch gesture on the surface of the cover plate via the touch sensing electrodes and the driver and sensing circuit.

10. The control pod of claim 1, wherein:
the user input responsive sensor comprises:
  gesture sensing electrodes; and
  a driver and sensing circuit coupled to the gesture sensing electrodes; and
the processor is configured to detect the user input of the control command in response to sensing of a predetermined non-touch gesture in the vicinity of the surface of the cover plate via the gesture sensing electrodes and the driver and sensing circuit.

11. The control pod of claim 1, wherein the processor and transmitter circuit are configured to send the control signal to the device in a signal format or data communication protocol, for:
lighting control; heating, ventilation and air condition (HVAC) control; building management system (BMS) control; or appliance control.

12. A control pod, comprising;
a controller; and
a cover plate configured to cover the controller when the control pod is mounted on or recessed into an architectural structure in a space, the cover plate including:
  a surface configured to be exposed to a user within the space; and
  a light transmissive area extending along a substantial section of an outer perimeter of the cover plate;
wherein the controller comprises:
  a user input responsive sensor;
  a selectively controllable light source coupled to the light transmissive area substantially along the outer perimeter of the cover plate;
  a driver circuit coupled to drive the light source to selectively emit light through points of the light transmissive area around the outer perimeter of the cover plate;
  a transmitter circuit, configured to transmit control signals to operate a device configured to control an environmental condition in the space; and
  a processor coupled to respond to data corresponding to user inputs sensed by the user input responsive sensor, coupled to control the light source via the driver circuit and coupled to the transmitter circuit, the processor being configured to:
  detect the user inputs of a control command based on a user action detected via the user input responsive sensor; and based on the detected control command:
  cause the transmitter circuit to send a control signal to the device to implement a function corresponding to the detected control command; and
  control the light source via the driver circuit to selectively provide a light output through the light transmissive area of the cover plate for a period of time following control command detection, as visible feedback corresponding to the detected control command, for observation by the user, along at least a portion of the section of the light transmissive area of the cover plate, wherein:
the user input responsive sensor comprises:
  a microphone;
  an analog to digital converter to convert analog audio signals from the microphone to digital signals; and
  a digital signal processor coupled to the converter to parse the digital signals and supply digital repetitions of speech inputs to the processor; and
  the processor is configured to detect the user input in the form of a verbalization of the control command in response to sensing digital repetitions of speech inputs.

13. A control pod, comprising:
a controller; and
a cover plate configured to cover the controller when the control pod is mounted on or recessed into an architectural structure in a space, the cover plate consisting of:
  a single, continuous surface, wherein the surface is and entirely accessible for user inputs within the space; and
  a light transmissive area extending along a substantial section of an outermost perimeter of the continuous surface of the cover plate;
wherein the controller comprises:
  a user input responsive sensor;
  a selectively controllable light source coupled to the light transmissive area along the outermost perimeter of the surface of the cover plate;
  a processor coupled to respond to user inputs sensed by the sensor and coupled to control the light source, the processor being configured to:
    detect user input of an environmental control command based on a user action detected via the user input responsive sensor; and
    based on the detected control command, control the light source to selectively provide visible feedback in the form of a selective light output through the section of the light transmissive area along a portion of the outermost perimeter of the continuous surface of the cover plate, the selective light output corresponding to the detected control command.

14. The control pod of claim 13, wherein:
the processor is further configured to selectively provide the light output through the section of the light transmissive area of the cover plate as a simulated movement of a point of light output along at least the portion of the outermost perimeter of the cover plate; and
the simulated movement corresponds to the detected control command.

15. The control pod of claim 14, wherein:
the processor is further configured to selectively provide another light output through the section of light transmissive area of the cover plate to provide simulated movement of another point of light output along at least the portion of the outermost perimeter of the cover plate; and
the simulated movement of the other point of light output also corresponds to the detected control command.

16. The control pod of claim 15, wherein during the simulated movements of the points of light outputs, the points of light output have a different light intensity from the simulated movement of other points of light output, and one point appears to follow the other point.

17. The control pod of claim 13, wherein:
the processor is further configured to selectively provide a light output as a static pattern of points of light output along at least the section of the light transmissive area of the cover plate; and
the static pattern of points of light output corresponds to the detected control command.

18. The control pod of claim 13, wherein:
the cover plate further includes a shoulder along a portion of the outermost perimeter of the cover plate, the shoulder extending away from a plane of the surface of the cover plate;
the light transmissive area is formed through the shoulder around the outermost perimeter of the exposed surface of the cover plate; and
the light source is configured to selectively emit light sideways through the light transmissive area through the shoulder and at least partially onto regions of the architectural structure around the cover plate.

19. The control pod of claim 13, wherein:
the user input responsive sensor comprises:
  touch sensing electrodes; and
  a driver and sensing circuit coupled to the touch sensing electrodes and the processor; and
  the processor is configured to detect the user input of the control command in response to sensing of a predetermined touch gesture on the surface of the cover plate via the touch sensing electrodes and the driver and sensing circuit.

20. The control pod of claim 13, wherein:
the user input responsive sensor comprises:
  gesture sensing electrodes; and
  a driver and sensing circuit coupled to the gesture sensing electrodes; and
  the processor is configured to detect the user input of the control command in response to sensing of a predetermined non-touch gesture in a vicinity of the surface of the cover plate via the gesture sensing electrodes and the driver and sensing circuit.

21. The control pod of claim 13, wherein:
the environmental control command is a user input that generates a control signal of a signal format or data communication protocol for: lighting control; heating, ventilation and air control (HVAC); building management systems (BMS) control; or appliance control.

22. A control pod, comprising:
a controller; and
a cover plate configured to cover the controller when the control pod is mounted on or recessed into an architectural structure in a space, the cover plate including:
  a surface configured to be exposed to a user within the space; and a light transmissive area extending along a substantial section of an outer perimeter of the cover plate;
wherein the controller comprises:
a user input responsive sensor;
a selectively controllable light source coupled to the light transmissive area along the outer perimeter of the cover plate;
a processor coupled to respond to user inputs sensed by the sensor and coupled to control the light source, the processor being configured to:
detect user input of an environmental control command based on a user action detected via the user input responsive sensor; and
based on the detected control command, control the light source to selectively provide visible feedback in the form of a selective light output through the section of the light transmissive area along a portion of the outer perimeter of the cover plate, the selective light output corresponding to the detected control command,
wherein:
the user input responsive sensor comprises:
a microphone;
an analog to digital converter to convert analog audio signals from the microphone to digital signals; and
a digital signal processor coupled to the converter to parse the digital signals and supply digital repetitions of speech inputs to the processor; and
the processor is configured to detect the user input in the forms of a verbalization of the control command in response to sensing digital repetitions of speech inputs.

23. A control pod, comprising:
a controller; and
a cover plate configured to cover the controller when the control pod is mounted on or recessed into an architectural structure in a space, the cover plate consisting of:
a single, continuous surface, wherein the surface is exposed and entirely accessible to user inputs within the space;
a shoulder along a portion of an outermost perimeter of the cover plate and extending from a plane of the continuous surface; and
a light transmissive area extending along a substantial section of the outermost perimeter of the continuous surface of the cover plate;
wherein the controller comprises:
a user input responsive sensor;
a selectively controllable light source coupled to the light transmissive area along the outermost perimeter of the surface of the cover plate;
a driver circuit coupled to drive the light source to selectively emit light in a lateral direction from the shoulder of the cover plate and through points of the light transmissive area of the cover plate;
a transmitter circuit, configured to transmit control signals to operate a device configured to control an environmental condition in the space; and
a processor coupled to respond to data corresponding to user inputs sensed by the user input responsive sensor, coupled to control the light source via the driver circuit and coupled to the transmitter circuit, the processor being configured to:
detect the user inputs of a control command based on a user action detected via the user input responsive sensor; and based on the detected control command:
cause the transmitter circuit to send a control signal to the device to implement a function corresponding to the detected control command; and
control the light source via the driver circuit to selectively provide a light output through the light transmissive area of the continuous surface of the cover plate for a period of time following control command detection, as visible feedback corresponding to the detected control command, for observation by the user, along at least the section of the light transmissive area of the cover plate.

24. The control pod of claim 23, wherein:
the user input responsive sensor comprises:
touch sensing electrodes; and
a driver and sensing circuit coupled to the touch sensing electrodes and the processor; and
the processor is configured to detect the user input of the control command in response to sensing of a predetermined touch gesture on the surface of the cover plate via the touch sensing electrodes and the driver and sensing circuit.

25. The control pod of claim 23, wherein:
the user input responsive sensor comprises:
gesture sensing electrodes; and
a driver and sensing circuit coupled to the gesture sensing electrodes; and
the processor is configured to detect the user input of the control command in response to sensing of a predetermined non-touch gesture in the vicinity of the surface of the cover plate via the gesture sensing electrodes and the driver and sensing circuit.

26. A control pod, comprising:
a controller; and
a cover plate configured to cover the controller when the control pod is mounted on or recessed into an architectural structure in a space, the cover plate including:
a surface configured to be exposed to a user within the space;
a shoulder along a portion of an outer perimeter of the cover plate and extending from a plane of the surface; and
a light transmissive area extending along a substantial section of the outer perimeter of the cover plate;
wherein the controller comprises:
a user input responsive sensor;
a selectively controllable light source coupled to the light transmissive area along the outer perimeter of the cover plate;
a driver circuit coupled to drive the light source to selectively emit light in a lateral direction from the shoulder of the cover plate and through points of the light transmissive area of the cover plate;
a transmitter circuit, configured to transmit control signals to operate a device configured to control an environmental condition in the space; and
a processor coupled to respond to data corresponding to user inputs sensed by the user input responsive sensor, coupled to control the light source via the driver circuit and coupled to the transmitter circuit, the processor being configured to:

detect the user inputs of a control command based on a user action detected via the user input responsive sensor; and based on the detected control command:
  cause the transmitter circuit to send a control signal to the device to implement a function corresponding to the detected control command; and
  control the light source via the driver circuit to selectively provide a light output through the light transmissive area of the cover plate for a period of time following control command detection, as visible feedback corresponding to the detected control command, for observation by the user, along at least the section of the light transmissive area of the cover plate, wherein:
the user input responsive sensor comprises:
  a microphone;
  an analog to digital converter to convert analog audio signals from the microphone to digital signals; and
  a digital signal processor coupled to the converter to parse the digital signals and supply digital repetitions of speech inputs to the processor; and
the processor is configured to detect the user input in the form of a verbalization of the control command in response to sensing digital repetitions of speech inputs.

27. An apparatus, comprising:
a controller configured for mounting in a standard electrical box through an opening in a structural architectural panel; and
a cover plate configured to mount over the opening in the structural architectural panel to cover the controller and the electrical box, the cover plate consisting of:
  a continuous surface configured to be exposed for user touch from within a space to be at least partially enclosed by the structural architectural panel;
  a shoulder along an outermost perimeter of the cover plate, the shoulder being contiguous and extending from a plane of the surface of the cover plate; and
  a light transmissive area on the shoulder along substantially the outermost perimeter of the cover plate,
wherein the controller comprises:
  a substrate;
  touch sensing electrodes mounted to the substrate;
  a touch sense driver and sensing circuit coupled to the touch sensing electrodes;
  gesture sensing electrodes mounted to the substrate;
  a gesture sense driver and sensing circuit coupled to the gesture sensing electrodes;
  a network data communication interface;
  a processor coupled to receive at least one of sensing signals, based upon user touch inputs on the cover plate, from the touch sense driver and sensing circuit or sensing signals, based upon user gestures near the cover plate, from the gesture sense driver and sensing circuit,
  wherein the processor is coupled to the network data communication interface and configured to process the at least one sensing signal received from the touch sense or gesture sense drivers and sensing circuits and send messages, via the interface, to control an output of one or more luminaires related to the touch and gesture user inputs;
  light emitting diodes around a perimeter of the controller, of sufficient number and oriented to emit light through the light transmissive area on the shoulder along the outer perimeter of the cover plate; and
a light emitting diode driver circuit coupled to the light emitting diodes and responsive to the processor to independently drive output of each of the light emitting diodes,
wherein the processor is further configured to control the light emitting diodes to provide visual feedback along at least a portion of the outer perimeter of the cover plate, wherein the visual feedback corresponds to control messages sent to the one or more luminaires.

* * * * *